US012786971B2

(12) United States Patent
Yang et al.

(10) Patent No.: US 12,786,971 B2
(45) Date of Patent: Nov. 3, 2026

(54) SIGNALING UPLINK CARRIER SELECTION INFORMATION

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 373 days.

(21) Appl. No.: 18/500,600

(22) Filed: Nov. 2, 2023

(65) Prior Publication Data

US 2025/0151039 A1 May 8, 2025

(51) Int. Cl.

| | |
|---|---|
| ***H04W 72/0453*** | (2023.01) |
| ***H04L 5/00*** | (2006.01) |
| ***H04W 72/21*** | (2023.01) |
| ***H04W 72/542*** | (2023.01) |

(52) U.S. Cl.
CPC ....... *H04W 72/0453* (2013.01); *H04L 5/0048* (2013.01); *H04W 72/21* (2023.01); *H04W 72/542* (2023.01)

(58) Field of Classification Search
CPC ............. H04W 72/0453; H04W 72/21; H04W 72/542; H04L 5/0048; H04L 5/0098; H04L 25/0226; H04L 5/001
See application file for complete search history.

(56) References Cited

U.S. PATENT DOCUMENTS

| | | | | |
|---|---|---|---|---|
| 2017/0054535 | A1* | 2/2017 | Lim | H04J 11/0023 |
| 2018/0042000 | A1* | 2/2018 | Zhang | H04B 7/04 |
| 2020/0044720 | A1* | 2/2020 | Venugopal | H04W 24/10 |
| 2021/0359882 | A1 | 11/2021 | Liu et al. | |
| 2022/0368496 | A1* | 11/2022 | Shreevastav | H04W 64/00 |
| 2023/0163913 | A1 | 5/2023 | Manolakos et al. | |
| 2023/0371123 | A1* | 11/2023 | Lee | H04L 1/1812 |
| 2024/0219558 | A1* | 7/2024 | Al-Mufti | H04W 64/00 |
| 2024/0389129 | A1* | 11/2024 | Rastegardoost | H04W 72/0453 |
| 2025/0080191 | A1* | 3/2025 | Ganesan | H04B 7/0626 |
| 2025/0330988 | A1* | 10/2025 | Zhang | H04W 72/21 |
| 2025/0386306 | A1* | 12/2025 | Yi | H04W 52/367 |

OTHER PUBLICATIONS

International Search Report and Written Opinion—PCT/US2024/044767—ISA/EPO—Nov. 22, 2024.

* cited by examiner

*Primary Examiner* — Oussama Roudani
(74) *Attorney, Agent, or Firm* — Harrity & Harrity, LLP

(57) ABSTRACT

Various aspects relate generally to dynamic uplink carrier selection for uplink control information (UCI) multiplexing. A user equipment may signal uplink carrier selection information to support informed carrier selection while decreasing the occurrence of switching gaps associated with signalling the uplink carrier selection information. The UE may transmit, on one carrier, uplink carrier quality indications associated with multiple carriers. The UE may receive a dynamic carrier selection indication and multiplex UCI on the selected carriers.

30 Claims, 13 Drawing Sheets

SIGNALING UPLINK CARRIER SELECTION INFORMATION

FIELD OF THE DISCLOSURE

Aspects of the present disclosure generally relate to wireless communication and specifically relate to techniques, apparatuses, and methods for signalling uplink carrier selection information.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to an apparatus for wireless communication at a user equipment (UE). The apparatus may include one or more memories and one or more processors coupled to the one or more memories. The one or more processors may be configured to transmit, using a first uplink carrier of a plurality of uplink carriers, on a dedicated uplink slot associated with a second uplink carrier of the plurality of uplink carriers, an enhanced sounding reference signal (eSRS), the eSRS indicating at least one of an uplink carrier quality indication associated with the second uplink carrier or uplink carrier selection information associated with the second uplink carrier. The one or more processors may be configured to receive an uplink carrier selection communication indicative of at least one selected uplink carrier of the plurality of uplink carriers.

Some aspects described herein relate to an apparatus for wireless communication at a network node. The apparatus may include one or more memories and one or more processors coupled to the one or more memories. The one or more processors may be configured to receive, using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier. The one or more processors may be configured to transmit an uplink carrier selection communication indicative of at least one selected uplink carrier of the plurality of uplink carriers.

Some aspects described herein relate to an apparatus for wireless communication at a UE. The apparatus may include one or more memories and one or more processors coupled to the one or more memories. The one or more processors may be configured to transmit, using a first uplink carrier of a plurality of uplink carriers, uplink channel state information (CSI) indicating at least one of an uplink carrier quality indication associated with a second uplink carrier of the plurality of uplink carriers or uplink carrier selection information associated with the second uplink carrier. The one or more processors may be configured to receive an uplink carrier selection communication indicative of at least one selected uplink carrier of the plurality of uplink carriers.

Some aspects described herein relate to an apparatus for wireless communication at a network node. The apparatus may include one or more memories and one or more processors coupled to the one or more memories. The one or more processors may be configured to receive, using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier. The one or more processors may be configured to transmit an uplink carrier selection communication indicative of at least one selected uplink carrier of the plurality of uplink carriers.

Some aspects described herein relate to a method of wireless communication performed at a UE. The method may include transmitting, by the UE and using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier. The method may include receiving, by the UE in association with the at least one of the uplink carrier quality indication or the uplink carrier selection information, an uplink carrier selection communication indicative of at least one selected uplink carrier of the plurality of uplink carriers.

Some aspects described herein relate to a method of wireless communication performed at a network node. The method may include receiving, by the network node and using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier. The method may include transmitting, by the network node in association with the at least one of the uplink carrier quality indication or the uplink carrier selection information, an uplink carrier selection communication indicative of at least one selected uplink carrier of the plurality of uplink carriers.

Some aspects described herein relate to a method of wireless communication performed at a UE. The method may include transmitting, by the UE and using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier. The method may include receiving, by the UE in association with the at least one of the uplink carrier quality indication or the uplink carrier selection information, an uplink carrier selection communication indicative of at least one selected uplink carrier of the plurality of uplink carriers.

Some aspects described herein relate to a method of wireless communication performed at a network node. The method may include receiving, by the network node and using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier. The method may include transmitting, by the network node in association with the at least one of the uplink carrier quality indication or the uplink carrier selection information, an uplink carrier selection communication indicative of at least one selected uplink carrier of the plurality of uplink carriers.

Some aspects described herein relate to a non-transitory computer-readable medium that stores a set of instructions for wireless communication by a UE. The set of instructions, when executed by one or more processors of the UE, may cause the UE to transmit, using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier. The set of instructions, when executed by one or more processors of the UE, may cause the UE to receive an uplink carrier selection communication indicative of at least one selected uplink carrier of the plurality of uplink carriers.

Some aspects described herein relate to a non-transitory computer-readable medium that stores a set of instructions for wireless communication by a network node. The set of instructions, when executed by one or more processors of the network node, may cause the network node to receive, using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier. The set of instructions, when executed by one or more processors of the network node, may cause the network node to transmit an uplink carrier selection communication indicative of at least one selected uplink carrier of the plurality of uplink carriers.

Some aspects described herein relate to a non-transitory computer-readable medium that stores a set of instructions for wireless communication by a UE. The set of instructions, when executed by one or more processors of the UE, may cause the UE to transmit, using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier. The set of instructions, when executed by one or more processors of the UE, may cause the UE to receive an uplink carrier selection communication indicative of at least one selected uplink carrier of the plurality of uplink carriers.

Some aspects described herein relate to a non-transitory computer-readable medium that stores a set of instructions for wireless communication by a network node. The set of instructions, when executed by one or more processors of the network node, may cause the network node to receive, using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier. The set of instructions, when executed by one or more processors of the network node, may cause the network node to transmit an uplink carrier selection communication indicative of at least one selected uplink carrier of the plurality of uplink carriers.

Some aspects described herein relate to an apparatus for wireless communication. The apparatus may include means for transmitting, using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier. The apparatus may include means for receiving an uplink carrier selection communication indicative of at least one selected uplink carrier of the plurality of uplink carriers.

Some aspects described herein relate to an apparatus for wireless communication. The apparatus may include means for receiving, using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier. The apparatus may include means for transmitting an uplink carrier selection communication indicative of at least one selected uplink carrier of the plurality of uplink carriers.

Some aspects described herein relate to an apparatus for wireless communication. The apparatus may include means for transmitting, using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier. The apparatus may include means for receiving an uplink carrier selection communication indicative of at least one selected uplink carrier of the plurality of uplink carriers.

Some aspects described herein relate to an apparatus for wireless communication. The apparatus may include means for receiving, using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier. The apparatus may include means for transmitting an uplink carrier selection communication indicative of at least one selected uplink carrier of the plurality of uplink carriers.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
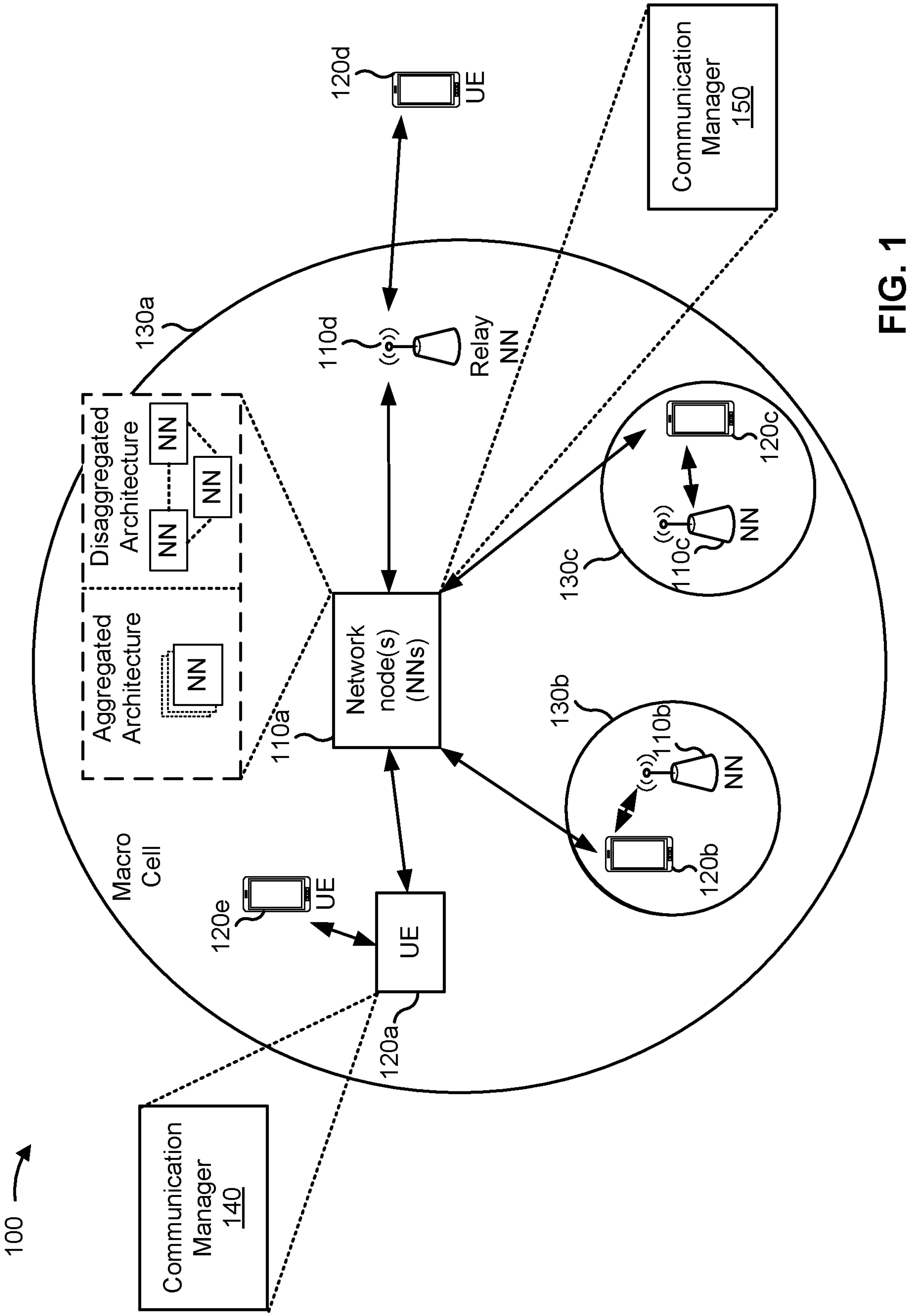
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Carrier aggregation is a technology that enables two or more component carriers (CCs, sometimes referred to as carriers) to be combined (e.g., into a single channel) for a single user equipment (UE) to enhance data capacity. Carriers can be combined in the same or different frequency bands. A UE may be configured to perform dual uplink (UL) transmissions in inter-band uplink carrier aggregation mode. In some cases, UEs can be equipped with up to two transmission (Tx) chains for uplink transmissions. A UE can operate in an inter-band uplink carrier aggregation mode in which a primary component carrier (PCC) is a frequency division duplex (FDD) carrier and a secondary component carrier (SCC) is a time division duplex (TDD) carrier (a mode that may be denoted "F+T"), or an inter-band uplink carrier aggregation mode in which a PCC is a TDD carrier and an SCC is an FDD carrier (a mode that may be denoted "T+F").

In some cases, in multi-carrier operation, a two-layered transmission UE (sometimes referred to as a "2Tx UE") can be configured with up to two uplink carriers (e.g., bands). The carriers can, in some cases, only be changed via a radio resource control (RRC) reconfiguration. Uplink transmission switching can be performed between the two uplink carriers. In some cases, network enhancements for dynamically selecting carriers with UL Tx switching (e.g., based on data traffic, TDD DL/UL configuration, bandwidths and/or channel conditions of each carrier, instead of RRC-based cell(s) reconfiguration), may potentially lead to a higher UL data rate, spectrum utilization, and UL capacity.

In some cases, a UE can be configured for UL Tx switching across up to three or four carriers with a restriction of up to two simultaneous transmissions for FR1 UEs, including mechanisms to enable more configured UL bands than the UE's simultaneous transmission capability and to support dynamic transmission carrier switching across the configured bands for both single timing advance group (TAG) and multiple TAG configurations.

In some cases, due to busy uplink traffic, a network node may not have a chance to measure an uplink signal-to-interference-plus-noise ratio (SINR) based on a PUSCH demodulation reference signal (DMRS). Moreover, transmitting SRSs on multiple carriers can result in unnecessary uplink transmission chain switching, as each uplink transmission chain needs switch time for switching between carriers. In some cases, the network node can be configured to perform carrier selection, which can be non-optimized due to the age of SINR measurements associated with multiple carriers, the lack of consideration of UE buffer size, and/or the lack of consideration of UE battery status. In some cases, the UE may measure downlink carriers to determine uplink carriers for TDD. The measurements may include transmission timing, path loss, power headroom (PHR) and/or reception receiver imbalance, among other examples. For example, in some cases, a UE can transmit, on a first carrier, an uplink carrier quality indication associated with the first carrier. The UE can transmit, on a second carrier, an uplink carrier quality indication associated with the second carrier, and so on. Between each transmission of uplink carrier quality indication, the UE switches carriers, resulting in a switching gap, causing uplink and, potentially, downlink interruption.

In any case, when switching from one carrier to another, a switching gap is used to facilitate the switching between transmission chains and/or other hardware and/or software associated with the respective carriers. In some cases, for uplink carrier aggregation, the switching gap can be as long as 35 microseconds (μs), 140 μs, and/or 210 μs, or 1, 4, or 6 OFDM symbols (for 30 kHz subcarrier spacing (SCS)). Both uplink carriers (e.g., the switched-from carrier and the switched-to carrier) can be impacted by the switching. Additionally, downlink transmission can be interrupted while the uplink behavior is interrupted for the uplink carrier switching. The interruption can occur on TDD carriers and/or FDD carriers. The interruption from switching gaps can result in decreased uplink throughput, decreased spectrum efficiency, and/or increased UE battery consumption.

Various aspects relate generally to uplink carrier selection for UCI multiplexing. Some aspects more specifically relate to dynamic uplink carrier selection for UCI multiplexing. Some aspects of the techniques described herein provide for signalling uplink carrier selection information to support informed carrier selection while decreasing the occurrence of switching gaps associated with signalling the uplink carrier selection information. In some aspects, for example, a UE may transmit, on one carrier, uplink carrier quality indications associated with multiple carriers. In this way, the UE does not switch to a new carrier to report an uplink carrier quality indication associated with that new carrier and, thus, avoids introducing additional uplink carrier switching gaps.

In some aspects, the UE may transmit an enhanced SRS (eSRS) to indicate an uplink carrier quality indication associated with an uplink carrier and/or to recommend an uplink carrier for selection. For example, the UE may transmit a first eSRS including an uplink carrier quality indication associated with a first uplink carrier, a second eSRS including an uplink carrier quality indication associated with a second uplink carrier, and so on. All of the eSRSs may be transmitted on the same single carrier.

An eSRS is an SRS that has an attribute that has been modified to implicitly indicate an uplink carrier quality associated with a corresponding carrier. For example, the modified attributes may include different eSRS precodings on different antenna ports, transmission timing, amplitude adjustments on different antenna ports, eSRS sequences on different antenna ports, and/or eSRS transmission powers on different antenna ports, among other examples. The UE and/or the network node may indicate (e.g., via RRC signalling) which slots correspond to which carriers and/or which eSRS attributes correspond to which measures of uplink carrier quality, among other examples. In this way, the UE may be able to implicitly provide carrier quality information to the network node to facilitate uplink carrier selection.

In some cases, the UE may transmit CSI to indicate the respective uplink carrier qualities and/or recommended uplink carriers. For example, the CSI may indicate carrier identifiers (IDs) for the respective carriers, a recommended carrier, and/or a respective uplink carrier quality associated with each uplink carrier configured on the UE. In this way, some aspects may enable the network node to use the information provided, on one carrier, by the UE to facilitate a more appropriate uplink carrier selection. In some cases, CSI that may be scheduled to be transmitted already may be extended to include the indications of the carrier IDs and/or uplink carrier quality and, in such cases, may be transmitted in different time slots. By using existing CSI signalling on a single carrier, some aspects may facilitate providing the network node with relevant carrier selection information without introducing additional signalling and/or additional carrier switching.

Particular aspects of the subject matter described in this disclosure can be implemented to realize one or more of the following potential advantages. In some examples, by enabling a network node to dynamically select and indicate one or more uplink carriers for UCI multiplexing, the described techniques can be used to mitigate UCI decoding errors. In some examples, by mitigating UCI decoding errors, the described techniques can be used to increase throughput and/or decrease latency, thereby positively impacting UE performance (and, thus user experience). In some examples, by selecting one or more uplink carriers based on uplink carrier quality indications and/or SINR measurements obtained by the network node, the described techniques can be used to facilitate uplink carrier selection in association with channel quality, thereby enhancing the quality of channels associated with selected uplink carriers. By using eSRSs transmitted on a single carrier and/or existing CSI signalling on a single carrier, some aspects may facilitate providing a network node with relevant carrier selection information while decreasing the frequency of carrier switching.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular radio access technology (RAT) (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHz), FR3 (7.125 GHZ through 24.25 GHz), FR4a or FR4-1 (52.6 GHz through 71 GHZ), FR4 (52.6 GHz through 114.25 GHZ), and FR5 (114.25 GHz through 300 GHz). Although a portion of FR1 is greater than 6 GHz, FR1 is often referred to (interchangeably) as a “Sub-6 GHz” band in some documents and articles. Similarly, FR2 is often referred to (interchangeably) as a “millimeter wave” band in some documents and articles, despite being different than the extremely high frequency (EHF) band (30 GHz through 300 GHz), which is identified by the International Telecommunications Union (ITU) as a “millimeter wave” band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, “sub-6 GHz,” if used herein, may broadly refer to frequencies that are less than 6 GHZ, that are within FR1, and/or that are included in mid-band frequencies. Similarly, the term “millimeter wave,” if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or a non-terrestrial network (NTN) network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel May be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or “IAB-donor”). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or “IAB-nodes”). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a “multi-hop network.” In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or “processing”) circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as “processors” or collectively as “the processor” or “the processor circuitry”). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs"). An MTC UE may be, may include, or may be included in or coupled with a robot, an unmanned aerial vehicle or drone, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of ultra-reliable low-latency communication (URLLC), enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some radio access technologies (RATs) may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, a UE (e.g., the UE 120) may include a communication manager 140. As described in more detail elsewhere herein, the communication manager 140 may transmit, using a first uplink carrier of a plurality of uplink carriers, on a dedicated uplink slot associated with a second uplink carrier of the plurality of uplink carriers, an enhanced sounding reference signal (eSRS), the eSRS indicating at least one of an uplink carrier quality indication associated with the second uplink carrier or uplink carrier selection information associated with the second uplink carrier; and receive an uplink carrier selection communication indicative of at least one selected uplink carrier of the plurality of uplink carriers.

In some aspects, the communication manager 140 may transmit, using a first uplink carrier of a plurality of uplink carriers, uplink channel state information (CSI) indicating at least one of an uplink carrier quality indication associated with a second uplink carrier of the plurality of uplink carriers or uplink carrier selection information associated with the second uplink carrier; and receive an uplink carrier selection communication indicative of at least one selected uplink carrier of the plurality of uplink carriers. Additionally, or alternatively, the communication manager 140 may perform one or more other operations described herein.

In some aspects, a network node (e.g., the network node 110) may include a communication manager 150. As described in more detail elsewhere herein, the communication manager 150 may receive, using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier; and transmit an uplink carrier selection communication indicative of at least one selected uplink carrier of the plurality of uplink carriers.

In some aspects, the communication manager 150 may receive, using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier; and transmit an uplink carrier selection communication indicative of at least one selected uplink carrier of the plurality of uplink carriers. Additionally, or alternatively, the communication manager 150 may perform one or more other operations described herein.

As indicated above, FIG. 1 is provided as an example. Other examples may differ from what is described with regard to FIG. 1.

Figure 2:
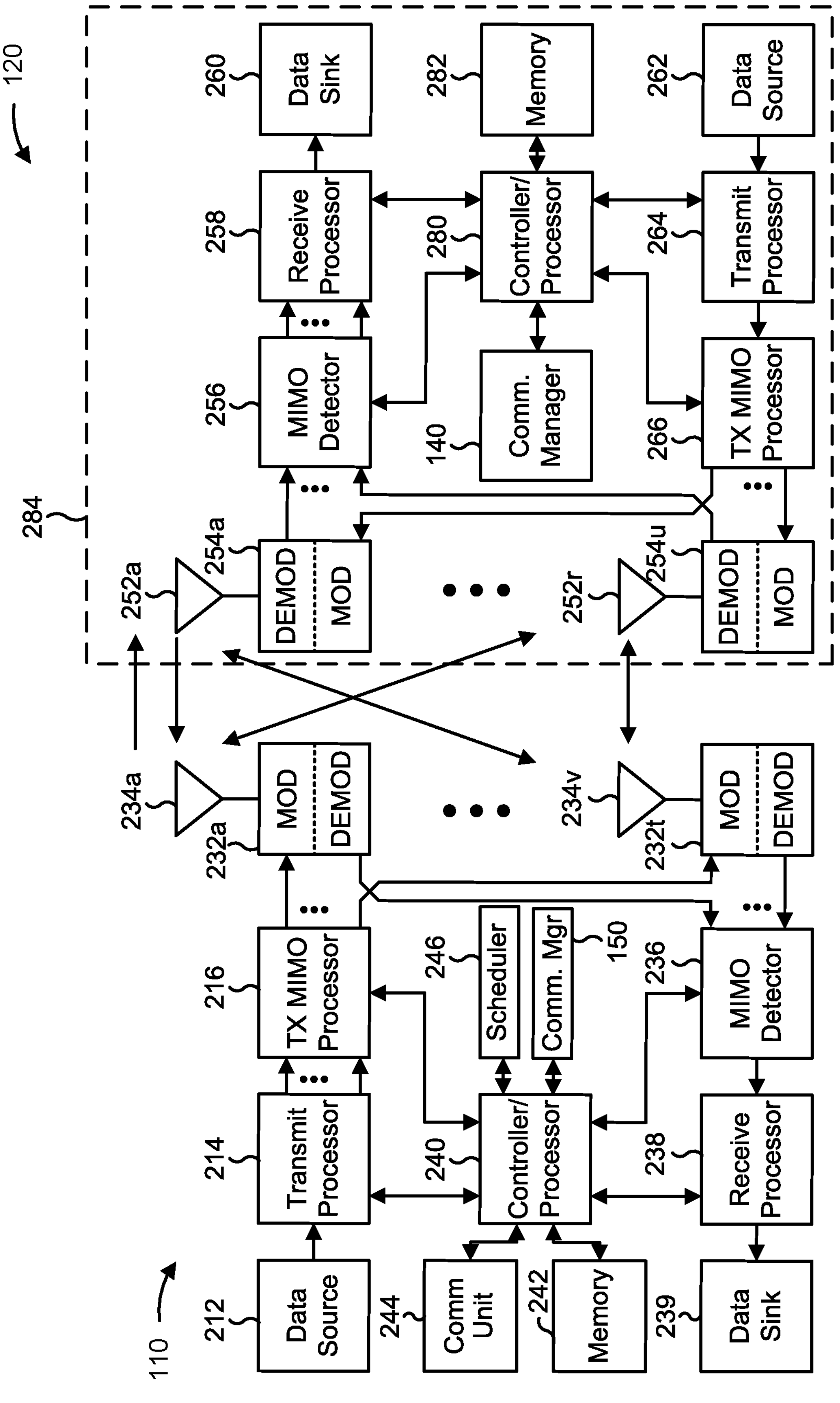
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing ((OFDM)) to obtain an output sample stream. Each modem 232 may further use the respective modulator component to process (for example, convert to analog, amplify, filter, and/or upconvert) the output sample stream to obtain a time domain downlink signal. The modems 232_a_ through 232_t_ may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252_a_ through 252_r_, where r≥1), a set of modems 254 (shown as modems 254_a_ through 254_u_, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a channel quality indicator (CQI) parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink SRS, and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
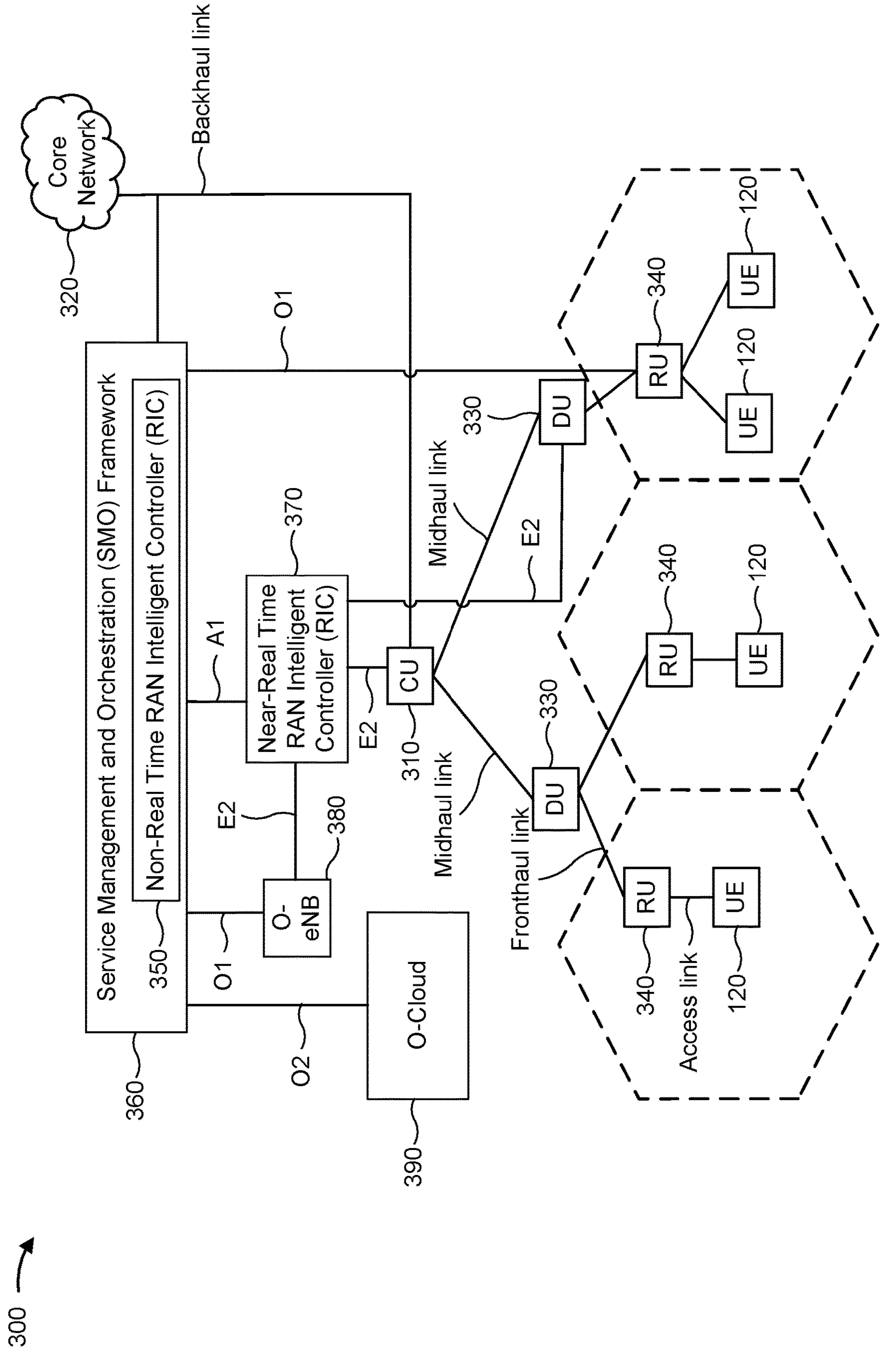
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 325 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUS 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU-UP units and one or more CU-CP units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, artificial intelligence and/or machine learning (AI/ML) workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with signalling uplink carrier selection information, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 800 of FIG. 8, process 900 of FIG. 9, process 1000 of FIG. 10, process 1100 of FIG. 11, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 800 of FIG. 8, process 900 of FIG. 9, process 1000 of FIG. 10, process 1100 of FIG. 11, or other processes as described herein. In some examples, executing instructions may include running the instructions, converting the instructions, compiling the instructions, and/or interpreting the instructions, among other examples.

In some aspects, a UE (e.g., the UE 120) includes means for transmitting, by the UE and using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier; and/or means for receiving, by the UE in association with the at least one of the uplink carrier quality indication or the uplink carrier selection information, an uplink carrier selection communication indicative of at least one selected uplink carrier of the plurality of uplink carriers.

In some aspects, a UE (e.g., the UE 120) includes means for transmitting, by the UE and using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier; and/or means for receiving, by the UE in association with the at least one of the uplink carrier quality indication or the uplink carrier selection information, an uplink carrier selection communication indicative of at least one selected uplink carrier of the plurality of uplink carriers. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for receiving, by the network node and using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier; and/or means for transmitting, by the network node in association with the at least one of the uplink carrier quality indication or the uplink carrier selection information, an uplink carrier selection communication indicative of at least one selected uplink carrier of the plurality of uplink carriers.

In some aspects, a network node (e.g., the network node 110) includes means for receiving, by the network node and using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier; and/or means for transmitting, by the network node in association with the at least one of the uplink carrier quality indication or the uplink carrier selection information, an uplink carrier selection communication indicative of at least one selected uplink carrier of the plurality of uplink carriers. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 4:
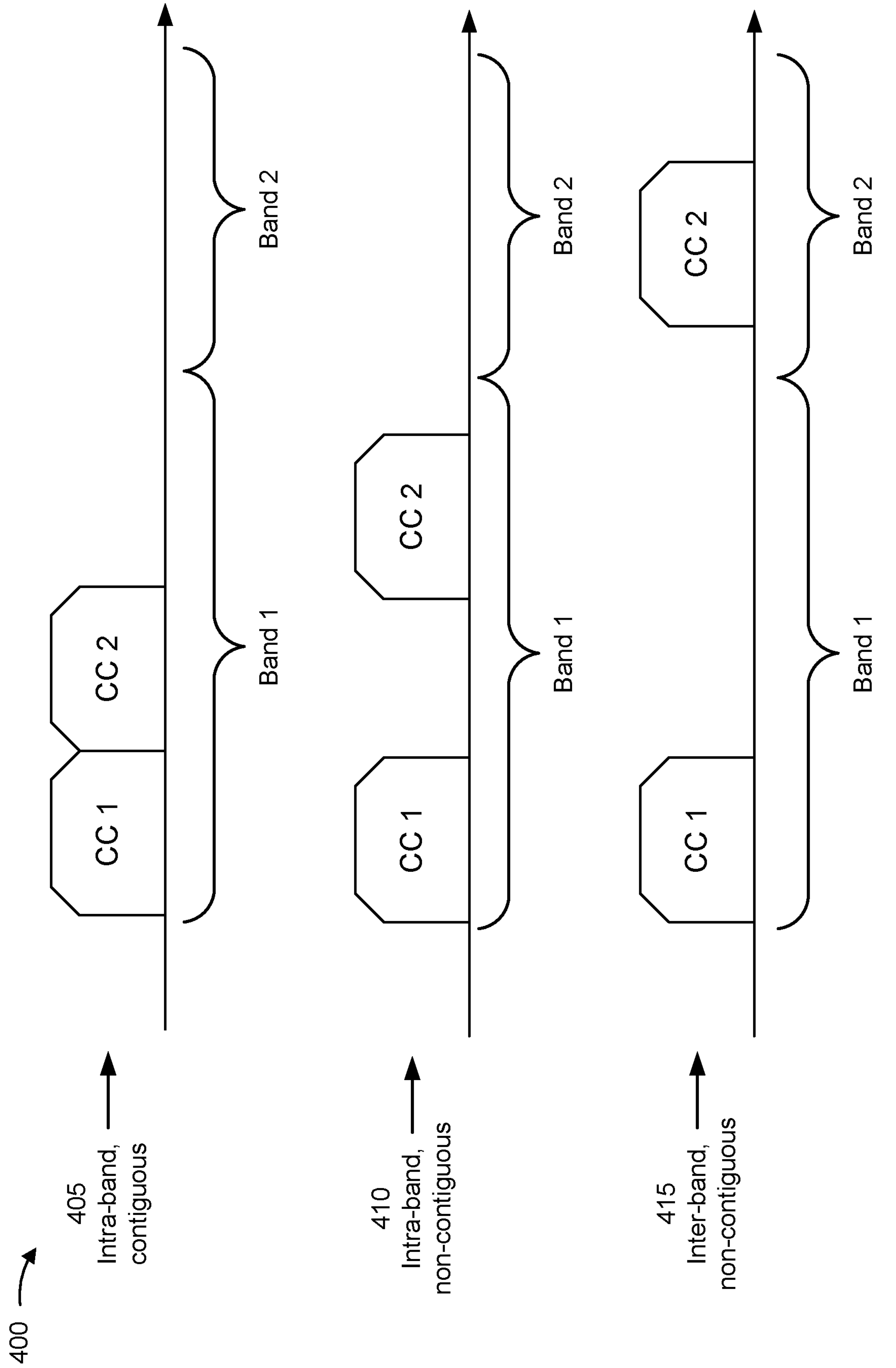
FIG. 4 is a diagram illustrating examples of carrier aggregation, in accordance with the present disclosure.

FIG. 4 is a diagram illustrating examples 400 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A network node 110 may configure carrier aggregation for a UE 120, such as in a radio resource control (RRC) message, downlink control information (DCI), and/or another signaling message.

As shown by reference number 405, in some aspects, carrier aggregation may be configured in an intra-band contiguous mode where the aggregated carriers are contiguous to one another and are in the same band. As shown by reference number 410, in some aspects, carrier aggregation may be configured in an intra-band non-contiguous mode where the aggregated carriers are non-contiguous to one another and are in the same band. As shown by reference number 415, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (PCell) and one or more secondary carriers or secondary cells (SCells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 4 is provided as an example. Other examples may differ from what is described with regard to FIG. 4.

A UE may be configured to perform dual uplink (UL) transmissions in inter-band uplink carrier aggregation mode. In some cases, UEs can be equipped with up to two transmission (Tx) chains for uplink transmissions. A UE can operate in an inter-band uplink carrier aggregation mode in which a primary component carrier (PCC) is a frequency division duplex (FDD) carrier and a secondary component carrier (SCC) is a time division duplex (TDD) carrier (a mode that may be denoted "F+T"), or an inter-band uplink carrier aggregation mode in which a PCC is a TDD carrier and an SCC is an FDD carrier (a mode that may be denoted "T+F").

In some cases, in multi-carrier operation, a two-layered transmission UE (sometimes referred to as a "2Tx UE") can be configured with up to two uplink carriers (e.g., bands). The carriers can, in some cases, only be changed via RRC reconfiguration. Uplink transmission switching can be performed between the two uplink carriers. In some cases, network enhancements for dynamically selecting carriers with UL Tx switching (e.g., based on data traffic, TDD DL/UL configuration, bandwidths and/or channel conditions of each carrier, instead of RRC-based cell(s) reconfiguration), may potentially lead to higher UL data rate, spectrum utilization and UL capacity.

In some cases, a UE can be configured for UL Tx switching across up to three or four carriers with a restriction of up to two simultaneous transmissions for FR1 UEs, including mechanisms to enable more configured UL bands than its simultaneous transmission capability and to support dynamic transmission carrier switching across the configured bands for both single timing advance group (TAG) and multiple TAGs configurations.

Figure 5:
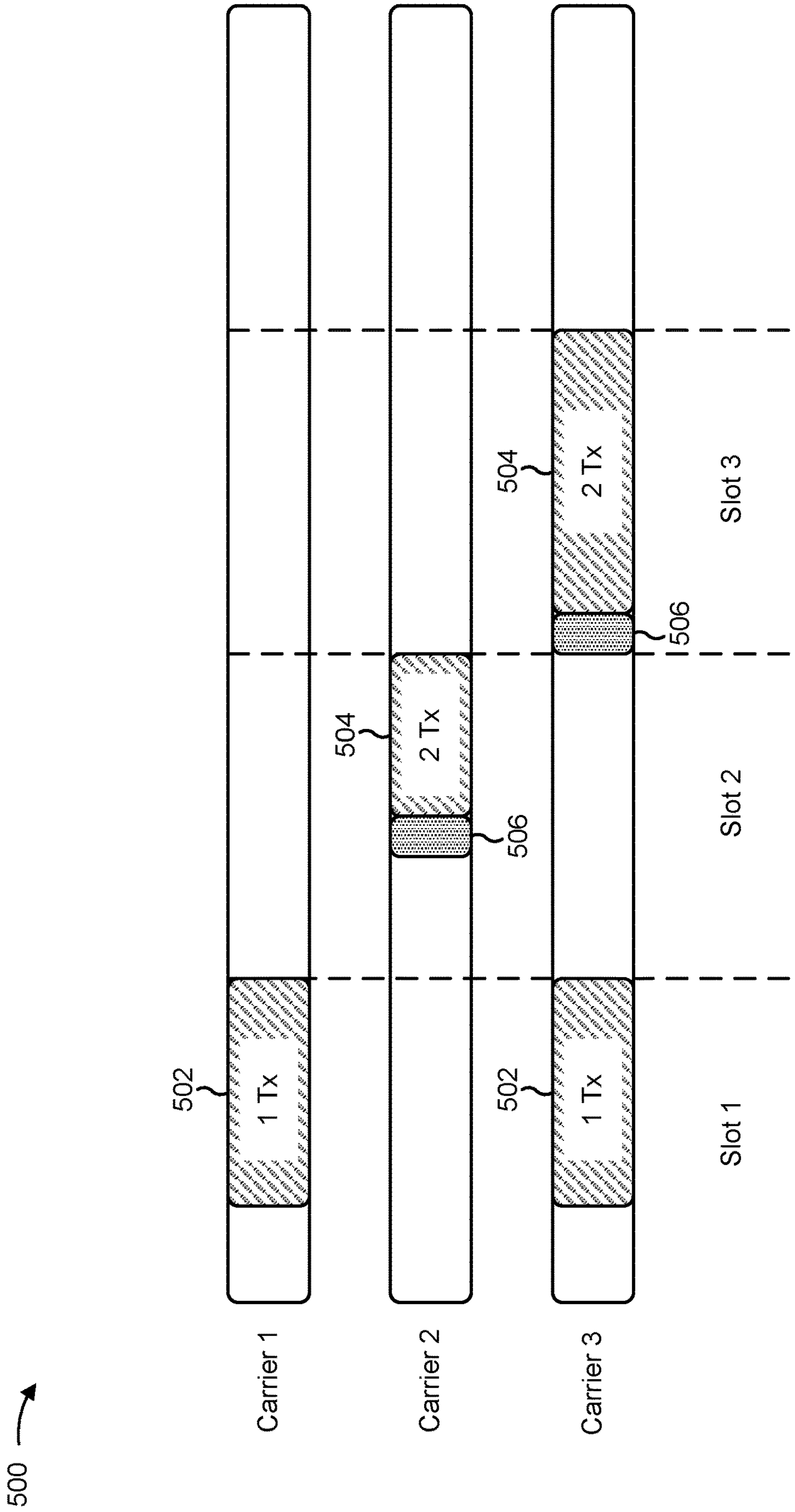
FIG. 5 is a diagram illustrating an example of uplink carrier switching, in accordance with the present disclosure.

FIG. 5 is a diagram illustrating an example 500 of uplink carrier switching, in accordance with the present disclosure. As shown in example 500, a UE may be configured with three carriers (shown as "carrier 1," "carrier 2," and "carrier 3"). In some cases, the UE can transmit two single layer transmissions (shown as "1 Tx") 502 in two carriers simultaneously (e.g., during a same time slot such as "slot 1") or a two layer transmission (shown as "2 Tx") 504 in one carrier during a time slot such as "slot 2" or "slot 3," as illustrated. Based on channel conditions, the UE may switch from one or two uplink carriers to another one or two uplink carriers. For example, as shown, the UE may transmit two one-layer transmissions 502 in slot 1 using carriers 1 and 3. The UE may then determine to switch to carrier 2 for a subsequent two-layer transmission 504 in slot 2 and to carrier 3 for a two-layer transmission 504 in slot 3.

For example, in some cases, the UE may employ non-codebook-based precoding when switching between carriers. In uplink non-codebook-based precoding, based on downlink measurements (e.g., measurements associated with a configured CSI reference signal (CSI-RS), the UE can select what it believes is a suitable uplink multi-layer precoder. Non-codebook-based precoding is thus based on an assumption of channel reciprocity, that is, that the UE can acquire detailed knowledge of the uplink channel based on downlink measurements.

In some cases, uplink carrier switching can be triggered by a TDD PUSCH and/or a sounding reference signal (SRS) TX with two ports via downlink control information (e.g., DCI0-1), a configured uplink grant, and/or an SRS with two ports. In some cases, uplink carrier switching can be triggered by an FDD PUSCH and/or an SRS transmission with one port via DCI, a configured uplink grant, a PUCCH, and/or an SRS with one port. In cases in which a dynamic grant (DG) conflicts with a configured grant (CG), the DG takes higher priority. In some cases, if an uplink grant is being skipped, the UE may drop a PUSCH transmission.

In some cases, due to busy uplink traffic, a network node may not have a chance to measure an uplink signal-to-interference-plus-noise ratio (SINR) based on a PUSCH demodulation reference signal (DMRS). Moreover, transmitting SRSs on multiple carriers can result in unnecessary uplink transmission chain switching, as each uplink transmission chain needs switch time for switching between carriers. In some cases, the network node can be configured to perform carrier selection, which can be non-optimized due to the age of SINR measurements associated with multiple carriers, the lack of consideration of UE buffer size, and/or the lack of consideration of UE battery status. In some cases, the UE may measure downlink carriers to determine uplink carriers for TDD. The measurements may include transmission timing, path loss, power headroom (PHR) and/or reception receiver imbalance, among other examples. For example, in some cases, a UE can transmit, on a first carrier, an uplink carrier quality indication associated with the first carrier. The UE can transmit, on a second carrier, an uplink carrier quality indication associated with the second carrier, and so on. Between each transmission of uplink carrier quality indication, the UE switches carriers, resulting in a switching gap, causing uplink and, potentially, downlink interruption.

In any case, when switching from one carrier to another, a switching gap 506 is used to facilitate the switching between transmission chains and/or other hardware and/or software associated with the respective carriers. In some cases, for uplink carrier aggregation, the switching gap can be as long as 35 microseconds (μs), 140 μs, and/or 210 μs, or 1, 4, or 6 OFDM symbols (for 30 kHz subcarrier spacing (SCS)). Both uplink carriers (e.g., the switched-from carrier and the switched-to carrier) can be impacted by the switching. Additionally, downlink transmission can be interrupted while the uplink behavior is interrupted for the uplink carrier switching. The interruption can occur on TDD carriers and/or FDD carriers. The interruption from switching gaps can result in decreased uplink throughput, decreased spectrum efficiency, and/or increased UE battery consumption.

Some aspects of the techniques described herein provide for signalling uplink carrier selection information to support informed carrier selection while decreasing the occurrence of switching gaps associated with signalling the uplink carrier selection information. In some aspects, for example, a UE may transmit, on one carrier, uplink carrier quality indications associated with multiple carriers. In this way, the UE does not switch to a new carrier to report an uplink carrier quality indication associated with that new carrier and, thus, avoids introducing additional uplink carrier switching gaps.

In some aspects, the UE may transmit an enhanced SRS (eSRS) to indicate an uplink carrier quality indication associated with an uplink carrier and/or to recommend an uplink carrier for selection. For example, the UE may transmit a first eSRS including an uplink carrier quality indication associated with a first uplink carrier, a second eSRS including an uplink carrier quality indication associated with a second uplink carrier, and so on. All of the eSRSs may be transmitted on the same single carrier.

An eSRS is an SRS that has an attribute that has been modified to implicitly indicate an uplink carrier quality associated with a corresponding carrier. For example, the modified attributes may include different eSRS precodings on different antenna ports, transmission timing, amplitude adjustments on different antenna ports, eSRS sequences on different antenna ports, and/or eSRS transmission powers on different antenna ports, among other examples. The UE and/or the network node may indicate (e.g., via RRC signalling) which slots correspond to which carriers and/or which eSRS attributes correspond to which measures of uplink carrier quality, among other examples. In this way, the UE may be able to implicitly provide carrier quality information to the network node to facilitate uplink carrier selection.

In some cases, the UE may transmit CSI to indicate the respective uplink carrier qualities and/or recommended uplink carriers. For example, the CSI may indicate carrier IDs for the respective carriers, a recommended carrier, and/or a respective uplink carrier quality associated with each uplink carrier configured on the UE. In this way, some aspects may enable the network node to use the information provided, on one carrier, by the UE to facilitate a more appropriate uplink carrier selection. In some cases, CSI that may be scheduled to be transmitted already may be extended to include the indications of the carrier IDs and/or uplink carrier quality and, in such cases, may be transmitted in different time slots. By using existing CSI signalling on a single carrier, some aspects may facilitate providing the network node with relevant carrier selection information without introducing additional signalling and/or additional carrier switching.

As indicated above, FIG. 5 is provided as an example. Other examples may differ from what is described with regard to FIG. 5.

Figure 6:
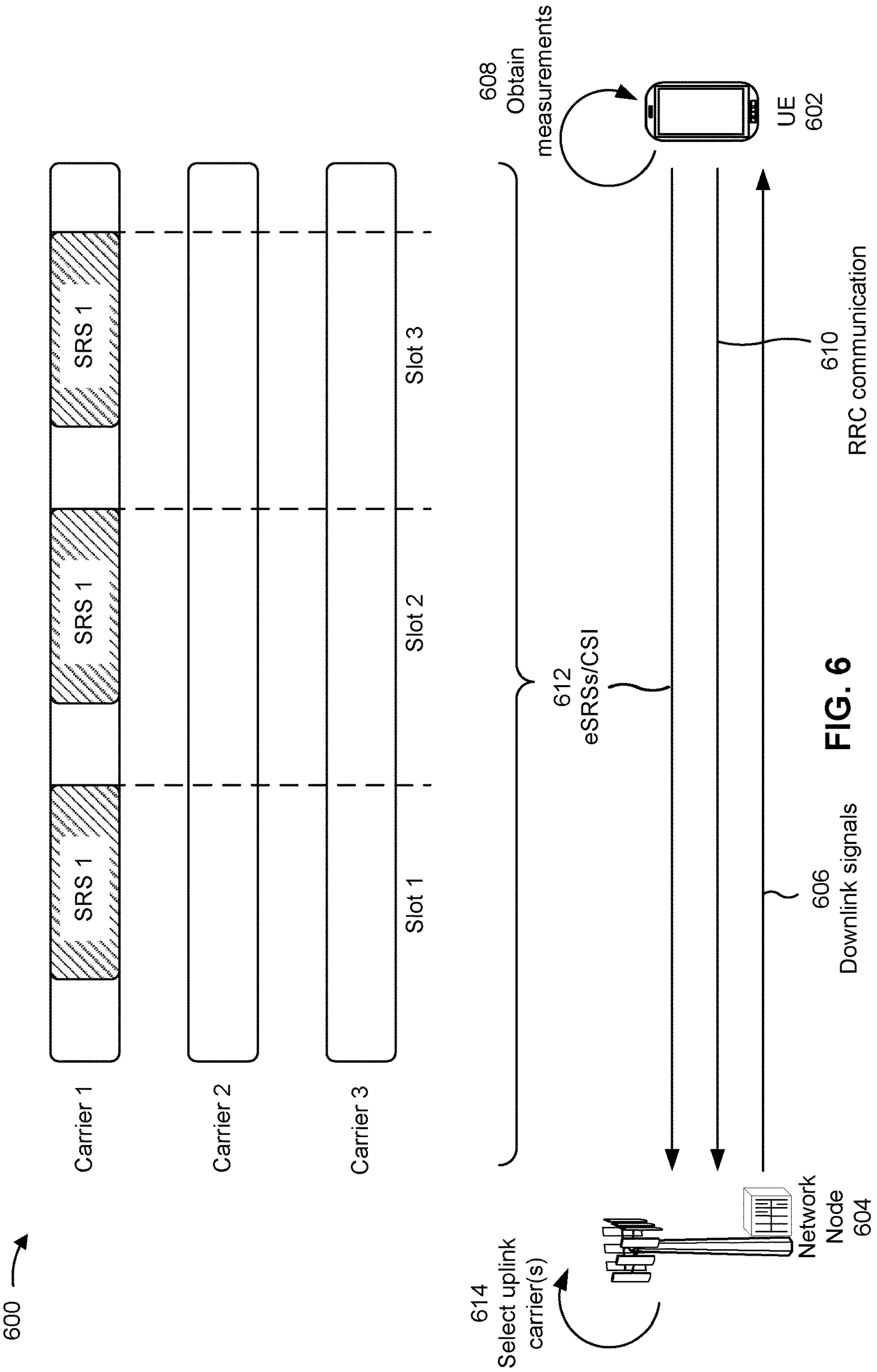
FIG. 6 is a diagram illustrating an example of associated with signalling uplink carrier selection information, in accordance with the present disclosure.

FIG. 6 is a diagram illustrating an example 600 of associated with signalling uplink carrier selection information, in accordance with the present disclosure. As shown in FIG. 6, a UE 602 may communicate with a network node 604. In some aspects, the UE 602 and the network node 604 may be part of a wireless network (e.g., wireless network 100). In some aspects, the UE 602 may be, be similar to, include, or be included in the UE 120 depicted in FIGS. 1-3. In some aspects, the network node 604 may be, be similar to, include, or be included in, the network node 110 depicted in FIGS. 1 and 2, and/or one or more components of the disaggregated base station architecture 300 depicted in FIG. 3. In some aspects, actions described as being performed by the network node 604 may be performed by multiple different network nodes 604. For example, configuration actions may be performed by a first network node 604 (e.g., a CU and/or a DU), and radio communication actions may be performed by a second network node 604 (e.g., a DU and/or an RU). The UE 602 and the network node 604 may have established a wireless connection prior to operations shown in FIG. 6.

As shown by reference number 606, the UE 602 may receive, and the network node 604 may transmit (directly or via one or more other network nodes), one or more signals. The one or more signals may include downlink reference signals, control signals, and/or data signals. As shown by reference number 608, the UE 602 may obtain measurements. The measurements may be associated with the one or more signals. For example, in some aspects, the measurements may include a buffer size, a transmission power, a transmission timing, multiple receivers imbalance, a switch between a reception antenna chain and a transmission antenna chain, a path loss, a difference in path loss between a downlink carrier and an associated uplink carrier, a PHR, a difference in PHRs between at least two uplink carriers, a UE battery capacity, and/or a traffic quality of service requirement.

As shown by reference number 610, the UE 602 may transmit (directly or via one or more other UEs and/or network nodes), and the network node 604 may receive, an RRC communication. The RRC communication may indicate an association between each time slot of a set of respective time slots (e.g., slot 1, slot 2, and slot 3) and a respective uplink carrier of a plurality of uplink carriers (e.g., carrier 1, carrier 2, and carrier 3). For example, the UE 602 may indicate, via the RRC communication, that slot 1 corresponds to carrier 1, slot 2 corresponds to carrier 2, and slot 3 corresponds to carrier 3. In some aspects, the slots need not be consecutive. For example, slot 1 may represent a first slot, slot 2 may represent a tenth slot, and slot 3 may represent a twentieth slot.

As shown by reference number 612, the UE 602 may transmit (directly or via one or more other UEs and/or network nodes), and the network node 604 may receive, a set of eSRSs and/or CSI. The eSRSs and/or CSI may be indicative of one or more recommended uplink carriers of the plurality of uplink carriers. In some aspects, the eSRSs and/or CSI may indicate uplink carrier quality information (e.g., channel quality information) associated with the respective carriers. For example, the uplink carrier quality information may include CSI associated with each carrier. The CSI may include, for example, a precoding matrix indicator (PMI), a rank indicator (RI), a reference signal received power (RSRP) value, a received signal strength indicator (RSRI), and/or an SINR, among other examples. In some aspects, the recommended one or more uplink carriers may be based on at least one measurement associated with at least one downlink carrier corresponding to at least one of the plurality of uplink carriers. In some aspects, the one or more recommended uplink carriers may be based on the measurements obtained by the UE 602.

As shown by reference number 614, the network node 604 may select one or more uplink carriers. For example, the network node 604 may select the one or more uplink carriers based on the eSRSs and/or CSI. In some aspects, the network node 604 may, additionally or alternatively, select the one or more uplink carriers based on SINR measurements performed by the network node 604 (e.g., associated with the eSRSs).

As indicated above, FIG. 6 is provided as an example. Other examples may differ from what is described with respect to FIG. 6.

Figure 7:
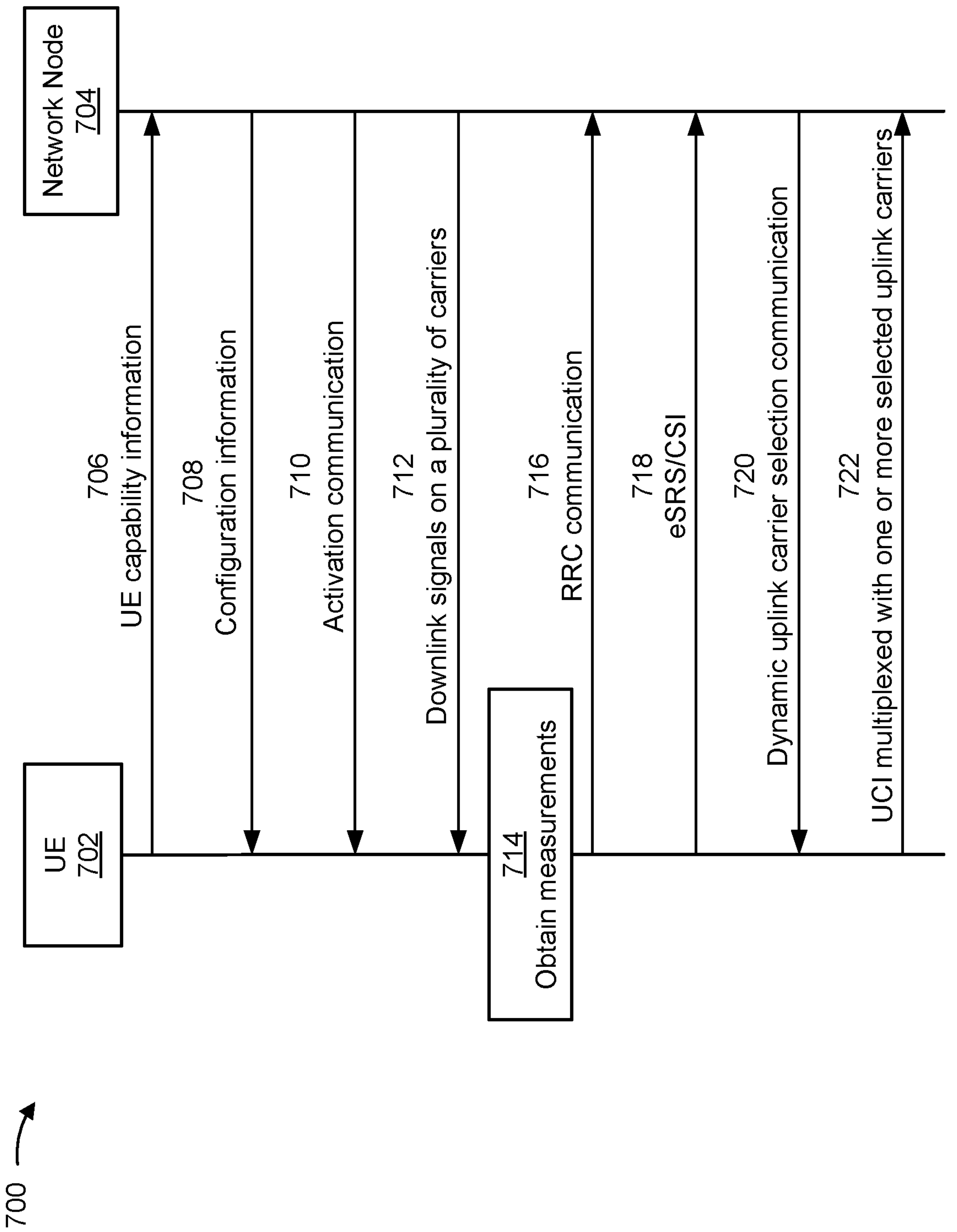
FIG. 7 is a diagram of an example associated with signalling uplink carrier selection information, in accordance with the present disclosure.

FIG. 7 is a diagram of an example 700 associated with signalling uplink carrier selection information, in accordance with the present disclosure. As shown in FIG. 7, a UE 702 may communicate with a network node 704. In some aspects, the UE 702 and the network node 704 may be part of a wireless network (e.g., wireless network 100). In some aspects, the UE 702 may be, be similar to, include, or be included in the UE 602 depicted in FIG. 6 and/or the UE 120 depicted in FIGS. 1-3. In some aspects, the network node 704 may be, be similar to, include, or be included in, the network node 604 depicted in FIG. 6, the network node 110 depicted in FIGS. 1 and 2, and/or one or more components of the disaggregated base station architecture 300 depicted in FIG. 3. In some aspects, actions described as being performed by the network node 704 may be performed by multiple different network nodes 704. For example, configuration actions may be performed by a first network node 704 (e.g., a CU and/or a DU), and radio communication actions may be performed by a second network node 704 (e.g., a DU and/or an RU). The UE 702 and the network node 704 may have established a wireless connection prior to operations shown in FIG. 7.

As shown by reference number 706, the UE 702 may transmit (directly or via one or more other UEs and/or network nodes), and the network node 704 may receive, UE capability information. In some aspects, the UE capability information may indicate a UE capability of supporting dynamic uplink carrier selection for a UCI multiplexing configuration. In some aspects, the UE capability information may be indicative of a capability for providing eSRS indicative of recommended carriers and/or uplink carrier quality indications. In some aspects, the UE capability information may be indicative of a capability for providing CSI indicative of recommended carriers and/or uplink carrier quality indications.

As shown by reference number 708, the network node 704 may transmit (directly or via one or more other network nodes), and the UE 702 may receive, configuration information. In some aspects, the UE 702 may receive the configuration information via RRC signaling, one or more medium access control (MAC) control elements (CEs), and/or DCI, among other examples. In some aspects, the configuration information may include an indication of one or more configuration parameters (e.g., already known to the UE 702 and/or previously indicated by the network node 704 or another network device) for selection by the UE 702, and/or explicit configuration information for the UE 702 to use to configure the UE 702, among other examples.

In some aspects, the configuration information may be indicative of a dynamic uplink carrier selection configuration. In some aspects, the configuration information may indicate that the UE is to receive a dynamic uplink carrier selection communication, provide uplink carrier recommendation indications, and/or provide uplink carrier quality indications to support uplink carrier selection. In some aspects, the UE 702 may configure itself, based at least in part on receiving the configuration information. In some aspects, the UE 702 may be configured to perform one or more operations described herein based at least in part on the configuration information.

As shown by reference number 710, the network node 704 may transmit, and the UE 702 may receive (directly or via one or more other UEs and/or network nodes), an activation communication. The activation communication may be associated with the dynamic uplink carrier selection configuration. For example, the activation communication may cause the UE 702 to activate a configuration in which the UE 702 may receive an indication of a dynamically selected uplink carrier.

As shown by reference number 712, the UE 702 may receive, and the network node 704 may transmit (directly or via one or more other network nodes), a plurality of downlink signals on a plurality of carriers. The signals may include downlink reference signals, control signals, and/or data signals. As shown by reference number 714, the UE 702 may obtain measurements. The measurements may be associated with the signals. For example, in some aspects, the measurements may include a buffer size, a transmission power, a transmission timing, multiple receivers imbalance, a switch between a reception antenna chain and a transmission antenna chain, a path loss, a difference in path loss between a downlink carrier and an associated uplink carrier, a PHR, a difference in PHRs between at least two uplink carriers, a UE battery capacity, and/or a traffic quality of service requirement, among other examples.

As shown by reference number 716, the UE 602 may transmit (directly or via one or more other UEs and/or network nodes), and the network node 704 may receive, an RRC communication. The RRC communication may indicate an association between each time slot of the respective time slots and a respective uplink carrier of the plurality of uplink carriers. For example, the RRC communication may indicate an association between each time slot of a set of respective time slots (e.g., slot 1, slot 2, and slot 3) and a respective uplink carrier of a plurality of uplink carriers (e.g., carrier 1, carrier 2, and carrier 3). For example, the RRC communication may indicate that a first slot is to include a first eSRS or a first uplink CSI communication associated with a first carrier, a second slot is to include a second eSRS or a second uplink CSI communication associated with a second carrier, and a third slot is to include a third eSRS or a third uplink CSI communication associated with a third carrier.

As shown by reference number 718, the UE 702 may transmit (directly or via one or more other UEs and/or network nodes), and the network node 704 may receive, one or more eSRSs and/or CSI. The one or more eSRSs and/or CSI may be indicative of one or more recommended uplink carriers of a plurality of uplink carriers. In some aspects, the one or more eSRSs and/or CSI may indicate uplink carrier quality information (e.g., channel quality information) associated with the plurality of carriers. For example, the uplink carrier information may include CSI associated with each carrier. The CSI may include, for example, a PMI, an RI, an RSRP value, an RSRI, and/or an SINR, among other examples.

In some aspects, for example, the UE 702 may transmit, using a first uplink carrier of a plurality of uplink carriers, on a dedicated uplink slot associated with a second uplink carrier of the plurality of uplink carriers, an eSRS. The eSRS may indicate at least one of an uplink carrier quality indication associated with the second uplink carrier or uplink carrier selection information associated with the second uplink carrier. In some aspects, the plurality of uplink carriers may include more than two uplink carriers. In some aspects, the uplink carrier selection information may indicate at least one recommended uplink carrier of the plurality of uplink carriers.

In some aspects, the at least one of the uplink carrier quality indication or the uplink carrier selection information may include a respective uplink carrier quality indication associated with each respective uplink carrier of the plurality of uplink carriers. For example, the respective uplink carrier quality indication may be based on at least one measurement associated with a respective downlink carrier, of a plurality of downlink carriers, corresponding to the respective uplink carrier of the plurality of uplink carriers. For example, in some aspects, the at least one measurement may include a buffer size, a transmission power, a transmission timing, multiple receivers imbalance, a switch between a reception antenna chain and a transmission antenna chain, a path loss, a difference in path loss between a downlink carrier and an associated uplink carrier, a PHR, a difference in PHRs between at least two uplink carriers, a UE battery capacity, and/or a traffic quality of service requirement, among other examples.

In some aspects, the at least one of the uplink carrier quality indication or the uplink carrier selection information may include an eSRS characteristic of the eSRS. For example, the eSRS characteristic may include at least one of an eSRS precoding on an antenna port, transmission timing, an amplitude adjustment on the antenna port, an eSRS sequence on the antenna port, or an eSRS transmission power on the antenna port. In some aspects, the one or more processors may be further configured to transmit a plurality of eSRSs, including the eSRS, on respective time slots of a plurality of time slots that includes the dedicated uplink slot.

In some aspects, the UE 702 may transmit, using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier. The uplink CSI may include a set of dedicated bits associated with the at least one of the uplink carrier quality indication or the uplink carrier selection information. In some aspects, the set of dedicated bits may indicate, for each uplink carrier of the plurality of uplink carriers, a respective uplink carrier ID and a respective channel quality. In some aspects, for example, the uplink CSI may indicate an uplink carrier quality indication associated with the second uplink carrier, an uplink carrier ID associated with the second uplink carrier, an uplink carrier quality indication associated with the first uplink carrier, and an uplink carrier ID associated with the first uplink carrier.

In some aspects, the UE 702 may transmit the CSI in a first uplink slot and the uplink CSI may indicate an uplink carrier quality indication associated with the second uplink carrier and an uplink carrier ID associated with the second uplink carrier. The UE 702 may transmit additional uplink CSI in a second uplink slot. The additional CSI may include an uplink carrier quality indication associated with the first uplink carrier and an uplink carrier ID associated with the first uplink carrier.

As shown by reference number 720, the network node 704 may transmit, and the UE 702 may receive, a dynamic uplink carrier selection communication. In some aspects, receiving the dynamic uplink carrier selection communication may include receiving the dynamic uplink carrier selection communication in accordance with the UE capability. In some aspects, the UE 702 may receive (and the network node 704 may transmit) the dynamic uplink carrier selection communication in accordance with the dynamic uplink carrier selection configuration.

In some aspects, the dynamic uplink carrier selection communication may be indicative of one or more selected uplink carriers, of a plurality of uplink carriers, for transmission of UCI in accordance with a UCI multiplexing configuration. For example, in some aspects, the at least one selected uplink carrier may include a single selected uplink carrier associated with a two-layer transmission. In some aspects, the at least one selected uplink carrier may include a first selected uplink carrier associated with a first one-layer transmission and a second selected uplink carrier associated with a second one-layer transmission.

In some aspects, the dynamic uplink carrier selection communication may include DCI carried on a PDCCH. The DCI may include a DCI physical uplink control channel resource indicator comprising at least one uplink carrier field, the at least one uplink carrier field indicating the one or more selected uplink carriers. In some aspects, the dynamic uplink carrier selection communication may include an RRC communication having a PUCCH resource table indicative of one or more uplink carrier IDs associated with the one or more selected uplink carriers for a UCI resource. In some aspects, the one or more selected uplink carriers are associated with at least one uplink measurement at the network node 504. For example, the at least one uplink measurement may include an SINR measurement associated with an SRS.

As shown by reference number 722, the UE 702 may transmit (directly or via one or more other UEs and/or network nodes), and the network node 704 may receive, the UCI multiplexed with the one or more selected uplink carriers. In this way, a network node 704 may be able to dynamically select one or more UE carriers for UCI multiplexed with PUSCH based on uplink carrier quality indications, uplink carrier recommendations, and/or one or more uplink measurements, thereby mitigating UCI decoding errors. Because the UE 702 may transmit the recommendations for all of the carriers on a single carrier, the dynamic uplink carrier selection may be supported while reducing the frequency of uplink channel switching, thereby improving uplink throughput, spectral efficiency, and/or UE power efficiency.

As indicated above, FIG. 7 is provided as an example. Other examples may differ from what is described with respect to FIG. 7.

Figure 8:
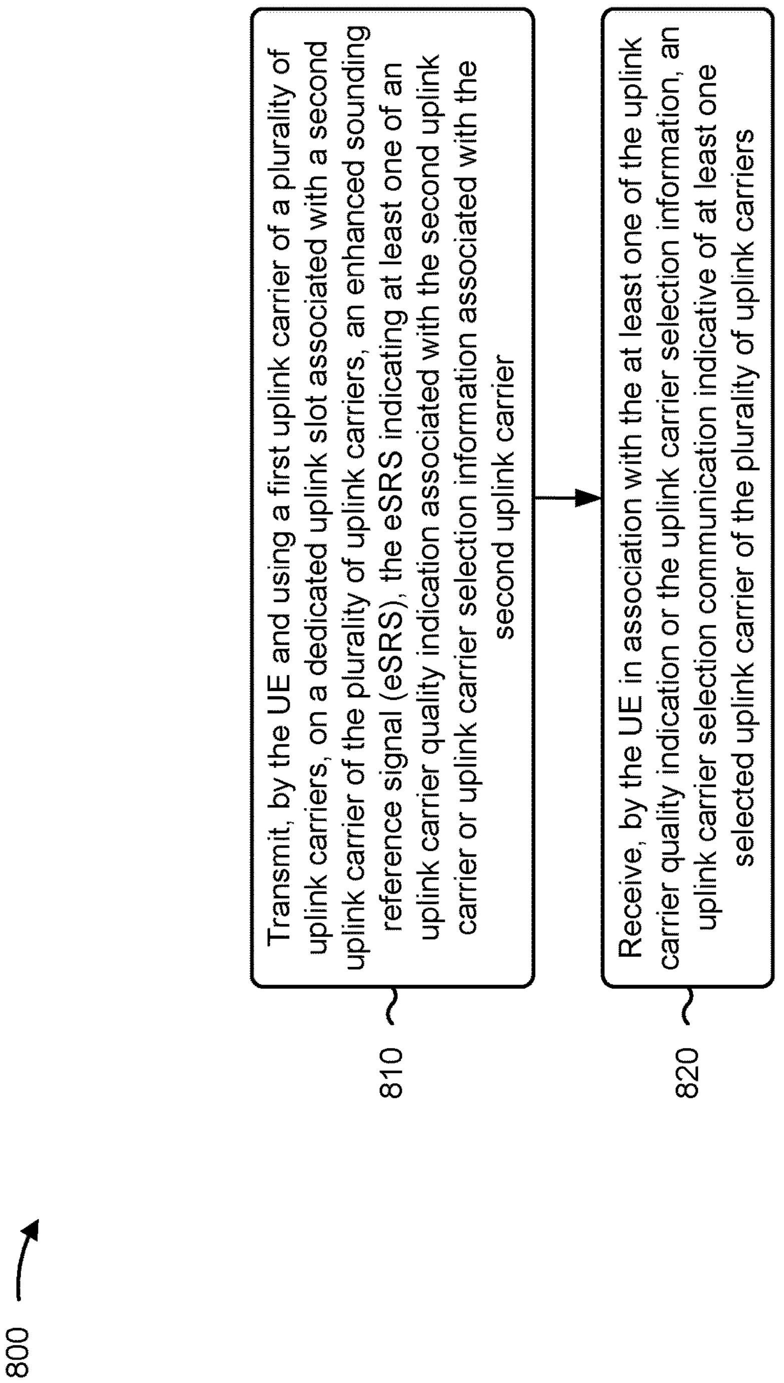
FIG. 8 is a diagram illustrating an example process performed, for example, at a UE or an apparatus of a UE, in accordance with the present disclosure.

FIG. 8 is a diagram illustrating an example process 800 performed, for example, at a UE or an apparatus of a UE, in accordance with the present disclosure. Example process 800 is an example where the apparatus or the UE (e.g., UE 702) performs operations associated with signalling uplink carrier selection information.

As shown in FIG. 8, in some aspects, process 800 may include transmitting, using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier (block 810). For example, the UE (e.g., using transmission component 1204 and/or communication manager 1206, depicted in FIG. 12) may transmit, using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier, as described above.

As further shown in FIG. 8, in some aspects, process 800 may include receiving an uplink carrier selection communication indicative of at least one selected uplink carrier of the plurality of uplink carriers (block 820). For example, the UE (e.g., using reception component 1202 and/or communication manager 1206, depicted in FIG. 12) may receive an uplink carrier selection communication indicative of at least one selected uplink carrier of the plurality of uplink carriers, as described above.

Process 800 may include additional aspects, such as any single aspect or any combination of aspects described below and/or in connection with one or more other processes described elsewhere herein.

In a first aspect, the plurality of uplink carriers comprises more than two uplink carriers.

In a second aspect, alone or in combination with the first aspect, the uplink carrier selection information indicates at least one recommended uplink carrier of the plurality of uplink carriers.

In a third aspect, alone or in combination with the second aspect, the at least one of the uplink carrier quality indication or the uplink carrier selection information comprises a respective uplink carrier quality indication associated with each respective uplink carrier of the plurality of uplink carriers.

In a fourth aspect, alone or in combination with the third aspect, the respective uplink carrier quality indication is based on at least one measurement associated with a respective downlink carrier, of a plurality of downlink carriers, corresponding to the respective uplink carrier of the plurality of uplink carriers.

In a fifth aspect, alone or in combination with one or more of the first through fourth aspects, the at least one measurement is associated with at least one of a buffer size, a transmission power, a transmission timing, multiple receivers imbalance, a switch between a reception antenna chain and a transmission antenna chain, a path loss, a difference in path loss between a downlink carrier and an associated uplink carrier, a PHR, a difference in PHRs between at least two uplink carriers, a UE battery capacity, and/or a traffic quality of service requirement.

In a sixth aspect, alone or in combination with one or more of the first through fifth aspects, process 800 includes transmitting, by the UE, UE capability information indicative of a capability for providing the eSRS.

In a seventh aspect, alone or in combination with one or more of the first through sixth aspects, the at least one of the uplink carrier quality indication or the uplink carrier selection information comprises an eSRS characteristic of the eSRS.

In an eighth aspect, alone or in combination with the seventh aspect, the eSRS characteristic comprises at least one of an eSRS precoding on an antenna port, transmission timing, an amplitude adjustment on the antenna port, an eSRS sequence on the antenna port, or an eSRS transmission power on the antenna port.

In a ninth aspect, alone or in combination with one or more of the first through eighth aspects, process 800 includes transmitting a plurality of eSRSs, including the eSRS, on respective time slots of a plurality of time slots that includes the dedicated uplink slot.

In a tenth aspect, alone or in combination with the ninth aspect, process 800 includes transmitting an RRC communication that indicates an association between each time slot of the respective time slots and a respective uplink carrier of the plurality of uplink carriers.

In an eleventh aspect, alone or in combination with one or more of the first through tenth aspects, the at least one selected uplink carrier comprises a single selected uplink carrier associated with a two-layer transmission.

In a twelfth aspect, alone or in combination with one or more of the first through eleventh aspects, the at least one selected uplink carrier comprises a first selected uplink carrier associated with a first one-layer transmission and a second selected uplink carrier associated with a second one-layer transmission.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
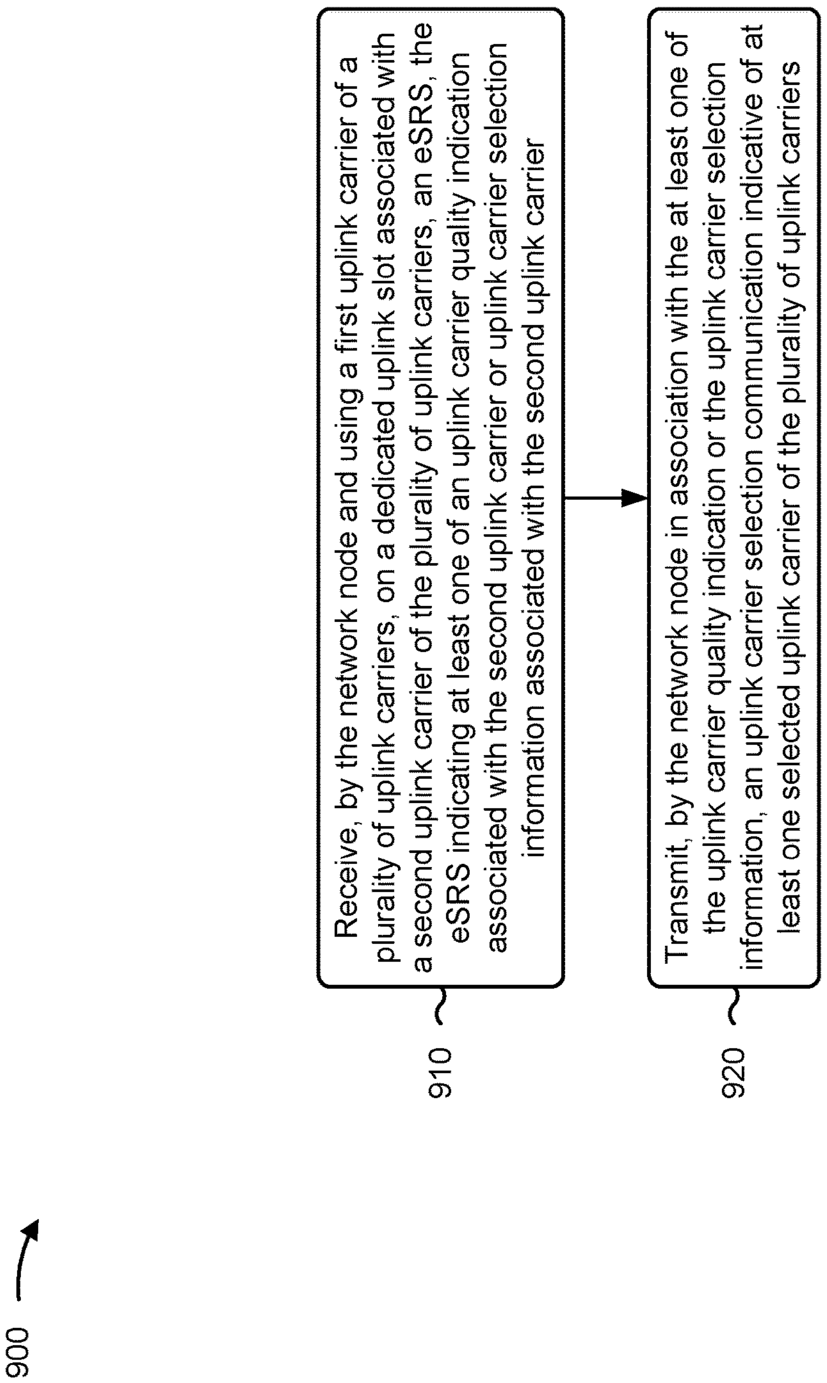
FIG. 9 is a diagram illustrating an example process performed, for example, at a network node or an apparatus of a network node, in accordance with the present disclosure.

FIG. 9 is a diagram illustrating an example process 900 performed, for example, at a network node or an apparatus of a network node, in accordance with the present disclosure. Example process 900 is an example where the apparatus or the network node (e.g., network node 704) performs operations associated with signalling uplink carrier selection information.

As shown in FIG. 9, in some aspects, process 900 may include receiving, using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier (block 910). For example, the network node (e.g., using reception component 1302 and/or communication manager 1306, depicted in FIG. 13) may receive, using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier, as described above.

As further shown in FIG. 9, in some aspects, process 900 may include transmitting an uplink carrier selection communication indicative of at least one selected uplink carrier of the plurality of uplink carriers (block 920). For example, the network node (e.g., using transmission component 1304 and/or communication manager 1306, depicted in FIG. 13) may transmit an uplink carrier selection communication indicative of at least one selected uplink carrier of the plurality of uplink carriers, as described above.

Process 900 may include additional aspects, such as any single aspect or any combination of aspects described below and/or in connection with one or more other processes described elsewhere herein.

In a first aspect, the plurality of uplink carriers comprises more than two uplink carriers.

In a second aspect, alone or in combination with the first aspect, the uplink carrier selection information indicates at least one recommended uplink carrier of the plurality of uplink carriers.

In a third aspect, alone or in combination with one or more of the first and second aspects, the at least one of the uplink carrier quality indication or the uplink carrier selection information comprises a respective uplink carrier quality indication associated with each respective uplink carrier of the plurality of uplink carriers.

In a fourth aspect, alone or in combination with the third aspect, the respective uplink carrier quality indication is based on at least one measurement associated with a respective downlink carrier, of a plurality of downlink carriers, corresponding to the respective uplink carrier of the plurality of uplink carriers.

In a fifth aspect, alone or in combination with the fourth aspect, the at least one measurement is associated with at least one of a buffer size, a transmission power, a transmission timing, multiple receivers imbalance, a switch between a reception antenna chain and a transmission antenna chain, a path loss, a difference in path loss between a downlink carrier and an associated uplink carrier, a PHR, a difference in PHRs between at least two uplink carriers, a UE battery capacity, and/or a traffic quality of service requirement.

In a sixth aspect, alone or in combination with one or more of the first through fifth aspects, process 900 includes receiving, by the network node, UE capability information indicative of a capability for providing the eSRS.

In a seventh aspect, alone or in combination with one or more of the first through sixth aspects, the at least one of the uplink carrier quality indication or the uplink carrier selection information comprises an eSRS characteristic of the eSRS.

In an eighth aspect, alone or in combination with the seventh aspect, the eSRS characteristic comprises at least one of an eSRS precoding on an antenna port, transmission timing, an amplitude adjustment on the antenna port, an eSRS sequence on the antenna port, or an eSRS transmission power on the antenna port.

In a ninth aspect, alone or in combination with one or more of the first through eighth aspects, process 900 includes receiving a plurality of eSRSs, including the eSRS, on respective time slots of a plurality of time slots that includes the dedicated uplink slot.

In a tenth aspect, alone or in combination with the ninth aspect, process 900 includes receiving an RRC communication that indicates an association between each time slot of the respective time slots and a respective uplink carrier of the plurality of uplink carriers.

In an eleventh aspect, alone or in combination with one or more of the first through tenth aspects, the at least one selected uplink carrier comprises a single selected uplink carrier associated with a two-layer transmission.

In a twelfth aspect, alone or in combination with one or more of the first through eleventh aspects, the at least one selected uplink carrier comprises a first selected uplink carrier associated with a first one-layer transmission and a second selected uplink carrier associated with a second one-layer transmission.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
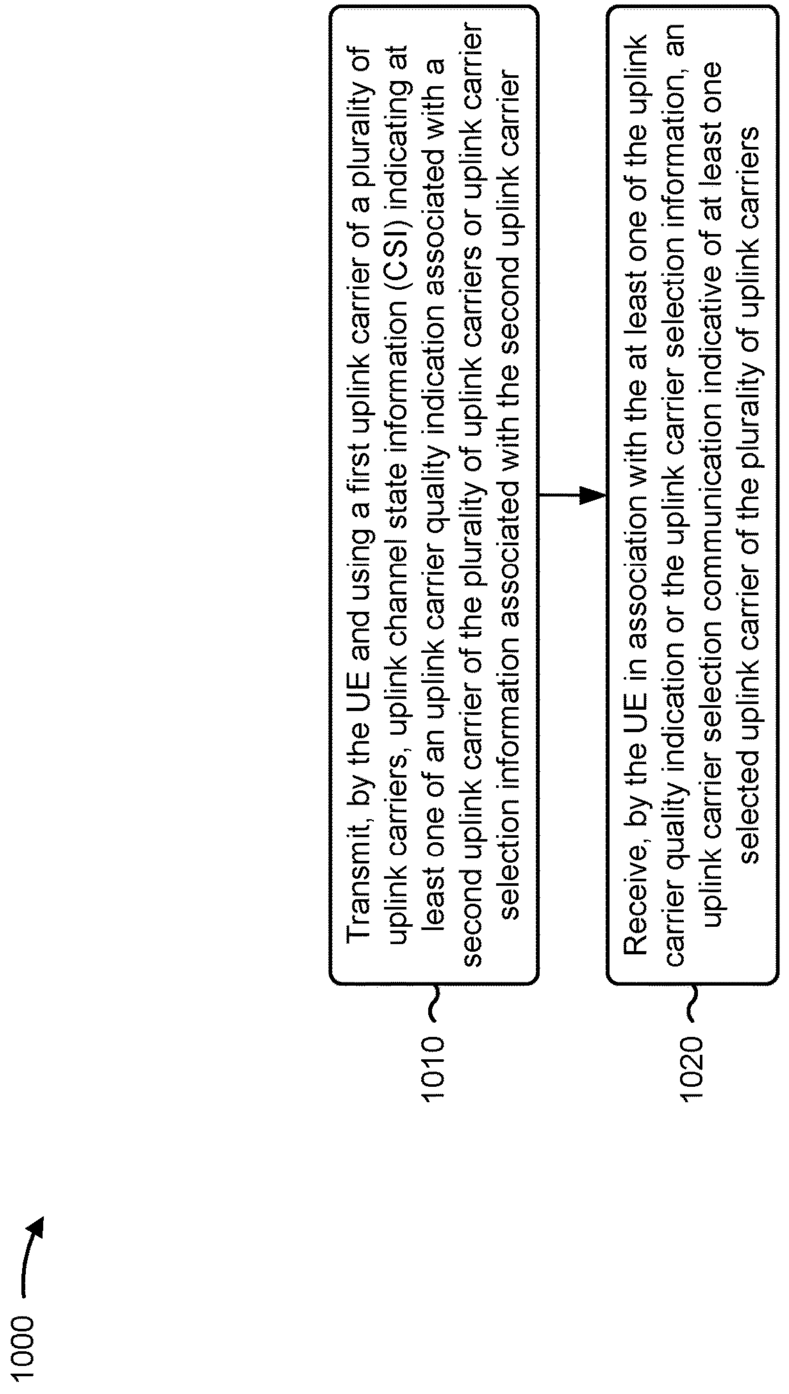
FIG. 10 is a diagram illustrating an example process performed, for example, at a UE or an apparatus of a UE, in accordance with the present disclosure.

FIG. 10 is a diagram illustrating an example process 1000 performed, for example, at a UE or an apparatus of a UE, in accordance with the present disclosure. Example process 1000 is an example where the apparatus or the UE (e.g., UE 702) performs operations associated with signalling uplink carrier selection information.

As shown in FIG. 10, in some aspects, process 1000 may include transmitting, using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier (block 1010). For example, the UE (e.g., using transmission component 1204 and/or communication manager 1206, depicted in FIG. 12) may transmit, using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier, as described above.

As further shown in FIG. 10, in some aspects, process 1000 may include receiving an uplink carrier selection communication indicative of at least one selected uplink carrier of the plurality of uplink carriers (block 1020). For example, the UE (e.g., using reception component 1202 and/or communication manager 1206, depicted in FIG. 12) may receive an uplink carrier selection communication indicative of at least one selected uplink carrier of the plurality of uplink carriers, as described above.

Process 1000 may include additional aspects, such as any single aspect or any combination of aspects described below and/or in connection with one or more other processes described elsewhere herein.

In a first aspect, the plurality of uplink carriers comprises more than two uplink carriers.

In a second aspect, alone or in combination with the first aspect, the uplink carrier selection information indicates at least one recommended uplink carrier of the plurality of uplink carriers.

In a third aspect, alone or in combination with one or more of the first and second aspects, the at least one of the uplink carrier quality indication or the uplink carrier selection information comprises a respective uplink carrier quality indication associated with each respective uplink carrier of the plurality of uplink carriers.

In a fourth aspect, alone or in combination with the third aspect, the respective uplink carrier quality indication is based on at least one measurement associated with a respective downlink carrier, of a plurality of downlink carriers, corresponding to the respective uplink carrier of the plurality of uplink carriers.

In a fifth aspect, alone or in combination with the fourth aspect, the at least one measurement is associated with at least one of a buffer size, a transmission power, a transmission timing, multiple receivers imbalance, a switch between a reception antenna chain and a transmission antenna chain, a path loss, a difference in path loss between a downlink carrier and an associated uplink carrier, a PHR, a difference in PHRs between at least two uplink carriers, a UE battery capacity, and/or a traffic quality of service requirement.

In a sixth aspect, alone or in combination with one or more of the first through fifth aspects, process 1000 includes transmitting, by the UE, UE capability information indicative of a capability for providing the uplink CSI.

In a seventh aspect, alone or in combination with one or more of the first through sixth aspects, the uplink CSI comprises a set of dedicated bits associated with the at least one of the uplink carrier quality indication or the uplink carrier selection information.

In an eighth aspect, alone or in combination with the seventh aspect, the set of dedicated bits indicates, for each uplink carrier of the plurality of uplink carriers, a respective uplink carrier ID and a respective channel quality.

In a ninth aspect, alone or in combination with one or more of the first through eighth aspects, the uplink CSI indicates the uplink carrier quality indication associated with the second uplink carrier, an uplink carrier ID associated with the second uplink carrier, an uplink carrier quality indication associated with the first uplink carrier, and an uplink carrier ID associated with the first uplink carrier.

In a tenth aspect, alone or in combination with one or more of the first through ninth aspects, transmitting the CSI comprises transmitting the CSI in a first uplink slot and the uplink CSI indicates the uplink carrier quality indication associated with the second uplink carrier and an uplink carrier ID associated with the second uplink carrier, and process 1000 includes transmitting, by the UE and using the first uplink carrier, additional uplink CSI in a second uplink slot, wherein the additional CSI comprises an uplink carrier quality indication associated with the first uplink carrier and an uplink carrier ID associated with the first uplink carrier.

In an eleventh aspect, alone or in combination with one or more of the first through tenth aspects, the at least one selected uplink carrier comprises a single uplink carrier associated with a two-layer transmission.

In a twelfth aspect, alone or in combination with one or more of the first through eleventh aspects, the at least one selected uplink carrier comprises a first uplink carrier associated with a first one-layer transmission and a second uplink carrier associated with a second one-layer transmission.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
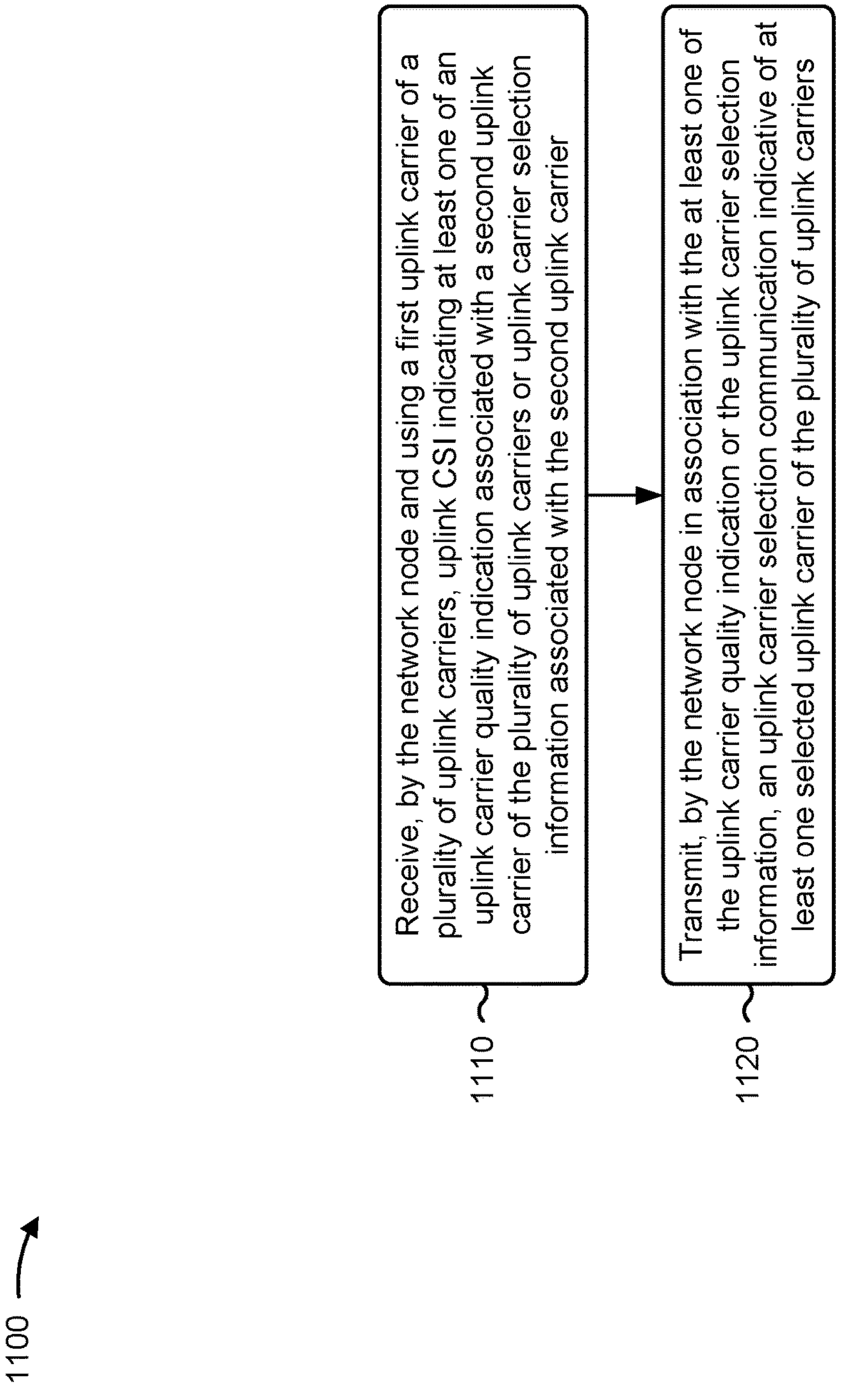
FIG. 11 is a diagram illustrating an example process performed, for example, at a network node or an apparatus of a network node, in accordance with the present disclosure.

FIG. 11 is a diagram illustrating an example process 1100 performed, for example, at a network node or an apparatus of a network node, in accordance with the present disclosure. Example process 1100 is an example where the apparatus or the network node (e.g., network node 704) performs operations associated with signalling uplink carrier selection information.

As shown in FIG. 11, in some aspects, process 1100 may include receiving, using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier (block 1110). For example, the network node (e.g., using reception component 1302 and/or communication manager 1306, depicted in FIG. 13) may receive, using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier, as described above.

As further shown in FIG. 11, in some aspects, process 1100 may include transmitting an uplink carrier selection communication indicative of at least one selected uplink carrier of the plurality of uplink carriers (block 1120). For example, the network node (e.g., using transmission component 1304 and/or communication manager 1306, depicted in FIG. 13) may transmit an uplink carrier selection communication indicative of at least one selected uplink carrier of the plurality of uplink carriers, as described above.

Process 1100 may include additional aspects, such as any single aspect or any combination of aspects described below and/or in connection with one or more other processes described elsewhere herein.

In a first aspect, the plurality of uplink carriers comprises more than two uplink carriers.

In a second aspect, alone or in combination with the first aspect, the uplink carrier selection information indicates at least one recommended uplink carrier of the plurality of uplink carriers.

In a third aspect, alone or in combination with one or more of the first and second aspects, the at least one of the uplink carrier quality indication or the uplink carrier selection information comprises a respective uplink carrier quality indication associated with each respective uplink carrier of the plurality of uplink carriers.

In a fourth aspect, alone or in combination with the third aspect, the respective uplink carrier quality indication is based on at least one measurement associated with a respective downlink carrier, of a plurality of downlink carriers, corresponding to the respective uplink carrier of the plurality of uplink carriers.

In a fifth aspect, alone or in combination with the fourth aspect, the at least one measurement is associated with at least one of a buffer size, a transmission power, a transmission timing, multiple receivers imbalance, a switch between a reception antenna chain and a transmission antenna chain, a path loss, a difference in path loss between a downlink carrier and an associated uplink carrier, a PHR, a difference in PHRs between at least two uplink carriers, a UE battery capacity, and/or a traffic quality of service requirement.

In a sixth aspect, alone or in combination with one or more of the first through fifth aspects, process 1100 includes receiving, by the network node, UE capability information indicative of a capability for providing the uplink CSI.

In a seventh aspect, alone or in combination with one or more of the first through sixth aspects, the uplink CSI comprises a set of dedicated bits associated with the at least one of the uplink carrier quality indication or the uplink carrier selection information.

In an eighth aspect, alone or in combination with the seventh aspect, the set of dedicated bits indicates, for each uplink carrier of the plurality of uplink carriers, a respective uplink carrier ID and a respective channel quality.

In a ninth aspect, alone or in combination with one or more of the first through eighth aspects, the uplink CSI indicates the uplink carrier quality indication associated with the second uplink carrier, an uplink carrier ID associated with the second uplink carrier, an uplink carrier quality indication associated with the first uplink carrier, and an uplink carrier ID associated with the first uplink carrier.

In a tenth aspect, alone or in combination with one or more of the first through ninth aspects, receiving the CSI comprises receiving the CSI in a first uplink slot, and the uplink CSI indicates the uplink carrier quality indication associated with the second uplink carrier and an uplink carrier ID associated with the second uplink carrier, and process 1100 includes receiving, by the network node and using the first uplink carrier, additional uplink CSI in a second uplink slot, wherein the additional CSI comprises an uplink carrier quality indication associated with the first uplink carrier and an uplink carrier ID associated with the first uplink carrier.

In an eleventh aspect, alone or in combination with one or more of the first through tenth aspects, the at least one selected uplink carrier comprises a single uplink carrier associated with a two-layer transmission.

In a twelfth aspect, alone or in combination with one or more of the first through eleventh aspects, the at least one selected uplink carrier comprises a first uplink carrier associated with a first one-layer transmission and a second uplink carrier associated with a second one-layer transmission.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
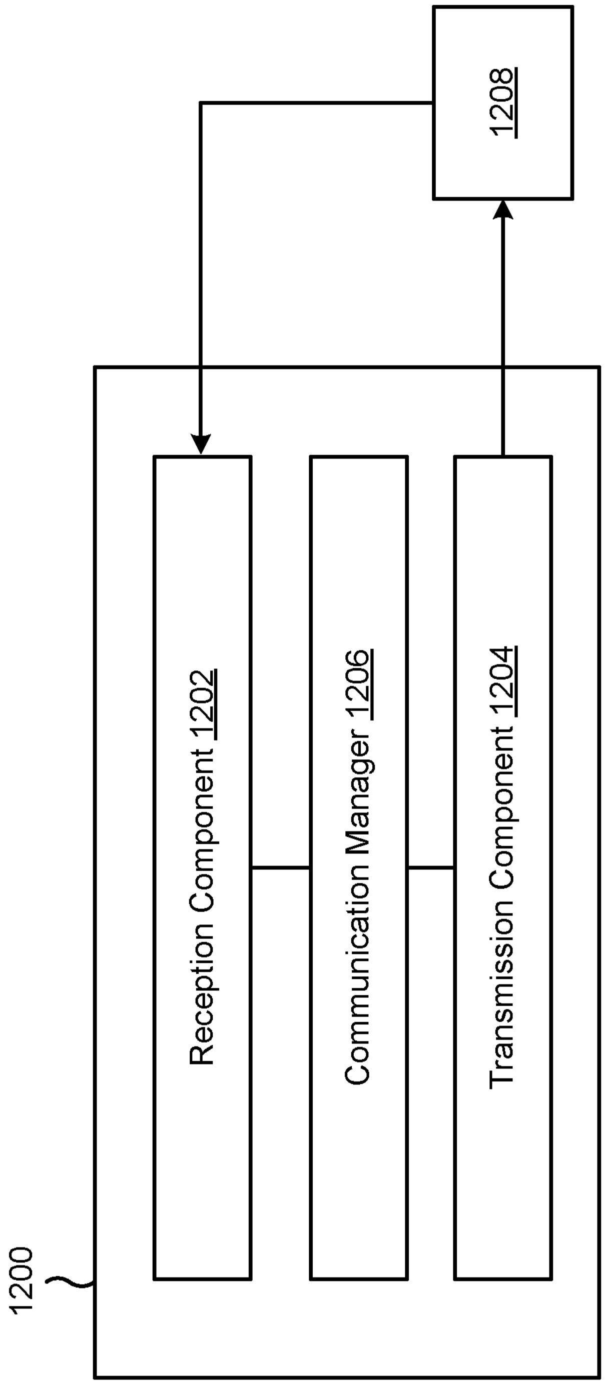
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 6 and 7. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1204 may be co-located with the reception component 1202 in one or more transceivers.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit, using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier. The reception component 1202 may receive an uplink carrier selection communication indicative of at least one selected uplink carrier of the plurality of uplink carriers.

The transmission component 1204 may transmit UE capability information indicative of a capability for providing the eSRS. The transmission component 1204 may transmit a plurality of eSRSs, including the eSRS, on respective time slots of a plurality of time slots that includes the dedicated uplink slot. The transmission component 1204 may transmit an RRC communication that indicates an association between each time slot of the respective time slots and a respective uplink carrier of the plurality of uplink carriers.

The transmission component 1204 may transmit, using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier. The reception component 1202 may receive an uplink carrier selection communication indicative of at least one selected uplink carrier of the plurality of uplink carriers. The transmission component 1204 may transmit UE capability information indicative of a capability for providing the uplink CSI.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
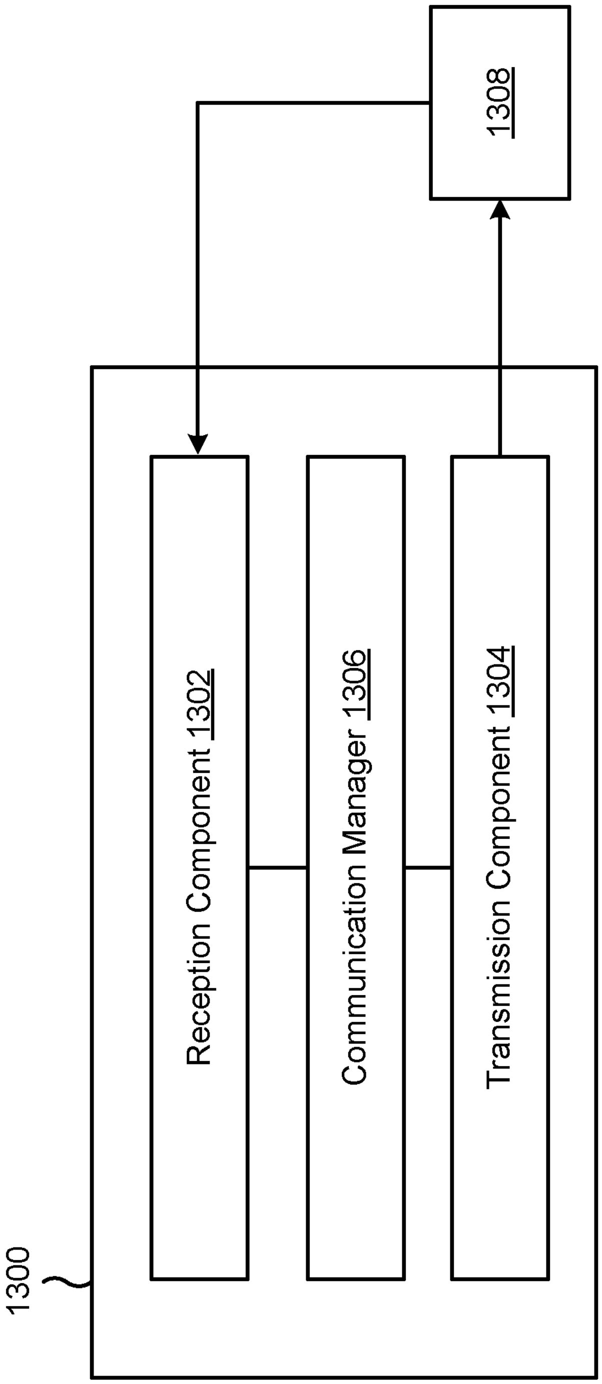
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 150 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 6 and 7. Additionally, or alternatively, the apparatus 1300 may be configured to perform one or more processes described herein, such as process 900 of FIG. 9, process 1100 of FIG. 11, or a combination thereof. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1302 and/or the transmission component 1304 may include or may be included in a network interface. The network interface may be configured to obtain and/or output signals for the apparatus 1300 via one or more communications links, such as a backhaul link, a midhaul link, and/or a fronthaul link.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1304 may be co-located with the reception component 1302 in one or more transceivers.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The reception component 1302 may receive, using a first uplink carrier of a plurality of uplink carriers, on a dedicated uplink slot associated with a second uplink carrier of the plurality of uplink carriers, an eSRS, the eSRS indicating at least one of an uplink carrier quality indication associated with the second uplink carrier or uplink carrier selection information associated with the second uplink carrier. The transmission component 1304 may transmit an uplink carrier selection communication indicative of at least one selected uplink carrier of the plurality of uplink carriers.

The reception component 1302 may receive UE capability information indicative of a capability for providing the eSRS. The reception component 1302 may receive a plurality of eSRSs, including the eSRS, on respective time slots of a plurality of time slots that includes the dedicated uplink slot. The reception component 1302 may receive an RRC communication that indicates an association between each time slot of the respective time slots and a respective uplink carrier of the plurality of uplink carriers.

The reception component 1302 may receive, using a first uplink carrier of a plurality of uplink carriers, uplink CSI indicating at least one of an uplink carrier quality indication associated with a second uplink carrier of the plurality of uplink carriers or uplink carrier selection information associated with the second uplink carrier. The transmission component 1304 may transmit an uplink carrier selection communication indicative of at least one selected uplink carrier of the plurality of uplink carriers. The reception component 1302 may receive UE capability information indicative of a capability for providing the uplink CSI.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed at a user equipment (UE), comprising: transmitting, by the UE and using a first uplink carrier of a plurality of uplink carriers, on a dedicated uplink slot associated with a second uplink carrier of the plurality of uplink carriers, an enhanced sounding reference signal (eSRS), the eSRS indicating at least one of an uplink carrier quality indication associated with the second uplink carrier or uplink carrier selection information associated with the second uplink carrier; and receiving, by the UE in association with the at least one of the uplink carrier quality indication or the uplink carrier selection information, an uplink carrier selection communication indicative of at least one selected uplink carrier of the plurality of uplink carriers.

Aspect 2: The method of Aspect 1, wherein the plurality of uplink carriers comprises more than two uplink carriers.

Aspect 3: The method of either of Aspects 1 or 2, wherein the uplink carrier selection information indicates at least one recommended uplink carrier of the plurality of uplink carriers.

Aspect 4: The method of any of Aspects 1-3, wherein the at least one of the uplink carrier quality indication or the uplink carrier selection information comprises a respective uplink carrier quality indication associated with each respective uplink carrier of the plurality of uplink carriers.

Aspect 5: The method of Aspect 4, wherein the respective uplink carrier quality indication is based on at least one measurement associated with a respective downlink carrier, of a plurality of downlink carriers, corresponding to the respective uplink carrier of the plurality of uplink carriers.

Aspect 6: The method of Aspect 5, wherein the at least one measurement is associated with at least one of a buffer size, a transmission power, a transmission timing, multiple receivers imbalance, a switch between a reception antenna chain and a transmission antenna chain, a path loss, a difference in path loss between a downlink carrier and an associated uplink carrier, a power headroom (PHR), a difference in PHRs between at least two uplink carriers, a UE battery capacity, and/or a traffic quality of service requirement.

Aspect 7: The method of any of Aspects 1-6, further comprising transmitting, by the UE, UE capability information indicative of a capability for providing the eSRS.

Aspect 8: The method of any of Aspects 1-7, wherein the at least one of the uplink carrier quality indication or the uplink carrier selection information comprises an eSRS characteristic of the eSRS.

Aspect 9: The method of Aspect 8, wherein the eSRS characteristic comprises at least one of an eSRS precoding on an antenna port, transmission timing, an amplitude adjustment on the antenna port, an eSRS sequence on the antenna port, or an eSRS transmission power on the antenna port.

Aspect 10: The method of any of Aspects 1-9, further comprising transmitting a plurality of eSRSs, including the eSRS, on respective time slots of a plurality of time slots that includes the dedicated uplink slot.

Aspect 11: The method of Aspect 10, further comprising transmitting a radio resource control (RRC) communication that indicates an association between each time slot of the respective time slots and a respective uplink carrier of the plurality of uplink carriers.

Aspect 12: The method of any of Aspects 1-11, wherein the at least one selected uplink carrier comprises a single selected uplink carrier associated with a two-layer transmission.

Aspect 13: The method of any of Aspects 1-12, wherein the at least one selected uplink carrier comprises a first selected uplink carrier associated with a first one-layer transmission and a second selected uplink carrier associated with a second one-layer transmission.

Aspect 14: A method of wireless communication performed at a network node, comprising: receiving, by the network node and using a first uplink carrier of a plurality of uplink carriers, on a dedicated uplink slot associated with a second uplink carrier of the plurality of uplink carriers, an enhanced sounding reference signal (eSRS), the eSRS indicating at least one of an uplink carrier quality indication associated with the second uplink carrier or uplink carrier selection information associated with the second uplink carrier; and transmitting, by the network node in association with the at least one of the uplink carrier quality indication or the uplink carrier selection information, an uplink carrier selection communication indicative of at least one selected uplink carrier of the plurality of uplink carriers.

Aspect 15: The method of Aspect 14, wherein the plurality of uplink carriers comprises more than two uplink carriers.

Aspect 16: The method of either of Aspects 14 or 15, wherein the uplink carrier selection information indicates at least one recommended uplink carrier of the plurality of uplink carriers.

Aspect 17: The method of any of Aspects 14-16, wherein the at least one of the uplink carrier quality indication or the uplink carrier selection information comprises a respective uplink carrier quality indication associated with each respective uplink carrier of the plurality of uplink carriers.

Aspect 18: The method of Aspect 17, wherein the respective uplink carrier quality indication is based on at least one measurement associated with a respective downlink carrier, of a plurality of downlink carriers, corresponding to the respective uplink carrier of the plurality of uplink carriers.

Aspect 19: The method of Aspect 18, wherein the at least one measurement is associated with at least one of a buffer size, a transmission power, a transmission timing, multiple receivers imbalance, a switch between a reception antenna chain and a transmission antenna chain, a path loss, a difference in path loss between a downlink carrier and an associated uplink carrier, a power headroom (PHR), a difference in PHRs between at least two uplink carriers, a UE battery capacity, and/or a traffic quality of service requirement.

Aspect 20: The method of any of Aspects 14-19, further comprising receiving, by the network node, UE capability information indicative of a capability for providing the eSRS.

Aspect 21: The method of any of Aspects 14-20, wherein the at least one of the uplink carrier quality indication or the uplink carrier selection information comprises an eSRS characteristic of the eSRS.

Aspect 22: The method of Aspect 21, wherein the eSRS characteristic comprises at least one of an eSRS precoding on an antenna port, transmission timing, an amplitude adjustment on the antenna port, an eSRS sequence on the antenna port, or an eSRS transmission power on the antenna port.

Aspect 23: The method of any of Aspects 14-22, further comprising receiving a plurality of eSRSs, including the eSRS, on respective time slots of a plurality of time slots that includes the dedicated uplink slot.

Aspect 24: The method of Aspect 23, further comprising receiving a radio resource control (RRC) communication that indicates an association between each time slot of the respective time slots and a respective uplink carrier of the plurality of uplink carriers.

Aspect 25: The method of any of Aspects 14-24, wherein the at least one selected uplink carrier comprises a single selected uplink carrier associated with a two-layer transmission.

Aspect 26: The method of any of Aspects 14-25, wherein the at least one selected uplink carrier comprises a first selected uplink carrier associated with a first one-layer transmission and a second selected uplink carrier associated with a second one-layer transmission.

Aspect 27: A method of wireless communication performed at a user equipment (UE), comprising: transmitting, by the UE and using a first uplink carrier of a plurality of uplink carriers, uplink channel state information (CSI) indicating at least one of an uplink carrier quality indication associated with a second uplink carrier of the plurality of uplink carriers or uplink carrier selection information associated with the second uplink carrier; and receiving, by the UE in association with the at least one of the uplink carrier quality indication or the uplink carrier selection information, an uplink carrier selection communication indicative of at least one selected uplink carrier of the plurality of uplink carriers.

Aspect 28: The method of Aspect 27, wherein the plurality of uplink carriers comprises more than two uplink carriers.

Aspect 29: The method of either of Aspects 27 or 28, wherein the uplink carrier selection information indicates at least one recommended uplink carrier of the plurality of uplink carriers.

Aspect 30: The method of any of Aspects 27-29, wherein the at least one of the uplink carrier quality indication or the uplink carrier selection information comprises a respective uplink carrier quality indication associated with each respective uplink carrier of the plurality of uplink carriers.

Aspect 31: The method of Aspect 30, wherein the respective uplink carrier quality indication is based on at least one measurement associated with a respective downlink carrier, of a plurality of downlink carriers, corresponding to the respective uplink carrier of the plurality of uplink carriers.

Aspect 32: The method of Aspect 31, wherein the at least one measurement is associated with at least one of a buffer size, a transmission power, a transmission timing, multiple receivers imbalance, a switch between a reception antenna chain and a transmission antenna chain, a path loss, a difference in path loss between a downlink carrier and an associated uplink carrier, a power headroom (PHR), a difference in PHRs between at least two uplink carriers, a UE battery capacity, and/or a traffic quality of service requirement.

Aspect 33: The method of any of Aspects 27-32, further comprising transmitting, by the UE, UE capability information indicative of a capability for providing the uplink CSI.

Aspect 34: The method of any of Aspects 27-33, wherein the uplink CSI comprises a set of dedicated bits associated with the at least one of the uplink carrier quality indication or the uplink carrier selection information.

Aspect 35: The method of Aspect 34, wherein the set of dedicated bits indicates, for each uplink carrier of the plurality of uplink carriers, a respective uplink carrier identifier (ID) and a respective channel quality.

Aspect 36: The method of any of Aspects 27-35, wherein the uplink CSI indicates: the uplink carrier quality indication associated with the second uplink carrier, an uplink carrier identifier (ID) associated with the second uplink carrier, an uplink carrier quality indication associated with the first uplink carrier, and an uplink carrier ID associated with the first uplink carrier.

Aspect 37: The method of any of Aspects 27-36, wherein transmitting the CSI comprises transmitting the CSI in a first uplink slot and wherein the uplink CSI indicates the uplink carrier quality indication associated with the second uplink carrier and an uplink carrier identifier (ID) associated with the second uplink carrier, the method further comprising transmitting, by the UE and using the first uplink carrier, additional uplink CSI in a second uplink slot, wherein the additional CSI comprises an uplink carrier quality indication associated with the first uplink carrier and an uplink carrier ID associated with the first uplink carrier.

Aspect 38: The method of any of Aspects 27-37, wherein the at least one selected uplink carrier comprises a single uplink carrier associated with a two-layer transmission.

Aspect 39: The method of any of Aspects 27-38, wherein the at least one selected uplink carrier comprises a first uplink carrier associated with a first one-layer transmission and a second uplink carrier associated with a second one-layer transmission.

Aspect 40: A method of wireless communication performed at a network node, comprising: receiving, by the network node and using a first uplink carrier of a plurality of uplink carriers, uplink channel state information (CSI) indicating at least one of an uplink carrier quality indication associated with a second uplink carrier of the plurality of uplink carriers or uplink carrier selection information associated with the second uplink carrier; and transmitting, by the network node in association with the at least one of the uplink carrier quality indication or the uplink carrier selection information, an uplink carrier selection communication indicative of at least one selected uplink carrier of the plurality of uplink carriers.

Aspect 41: The method of Aspect 40, wherein the plurality of uplink carriers comprises more than two uplink carriers.

Aspect 42: The method of either of Aspects 40 or 41, wherein the uplink carrier selection information indicates at least one recommended uplink carrier of the plurality of uplink carriers.

Aspect 43: The method of any of Aspects 40-42, wherein the at least one of the uplink carrier quality indication or the uplink carrier selection information comprises a respective uplink carrier quality indication associated with each respective uplink carrier of the plurality of uplink carriers.

Aspect 44: The method of Aspect 43, wherein the respective uplink carrier quality indication is based on at least one measurement associated with a respective downlink carrier, of a plurality of downlink carriers, corresponding to the respective uplink carrier of the plurality of uplink carriers.

Aspect 45: The method of Aspect 44, wherein the at least one measurement is associated with at least one of a buffer size, a transmission power, a transmission timing, multiple receivers imbalance, a switch between a reception antenna chain and a transmission antenna chain, a path loss, a difference in path loss between a downlink carrier and an associated uplink carrier, a power headroom (PHR), a difference in PHRs between at least two uplink carriers, a UE battery capacity, and/or a traffic quality of service requirement.

Aspect 46: The method of any of Aspects 40-45, further comprising receiving, by the network node, UE capability information indicative of a capability for providing the uplink CSI.

Aspect 47: The method of any of Aspects 40-46, wherein the uplink CSI comprises a set of dedicated bits associated with the at least one of the uplink carrier quality indication or the uplink carrier selection information.

Aspect 48: The method of Aspect 47, wherein the set of dedicated bits indicates, for each uplink carrier of the plurality of uplink carriers, a respective uplink carrier identifier (ID) and a respective channel quality.

Aspect 49: The method of any of Aspects 40-48, wherein the uplink CSI indicates: the uplink carrier quality indication associated with the second uplink carrier, an uplink carrier identifier (ID) associated with the second uplink carrier, an uplink carrier quality indication associated with the first uplink carrier, and an uplink carrier ID associated with the first uplink carrier.

Aspect 50: The method of any of Aspects 40-49, wherein receiving the CSI comprises receiving the CSI in a first uplink slot and wherein the uplink CSI indicates the uplink carrier quality indication associated with the second uplink carrier and an uplink carrier identifier (ID) associated with the second uplink carrier, the method further comprising receiving, by the network node and using the first uplink carrier, additional uplink CSI in a second uplink slot, wherein the additional CSI comprises an uplink carrier quality indication associated with the first uplink carrier and an uplink carrier ID associated with the first uplink carrier.

Aspect 51: The method of any of Aspects 40-50, wherein the at least one selected uplink carrier comprises a single uplink carrier associated with a two-layer transmission.

Aspect 52: The method of any of Aspects 40-51, wherein the at least one selected uplink carrier comprises a first uplink carrier associated with a first one-layer transmission and a second uplink carrier associated with a second one-layer transmission.

Aspect 53: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-13.

Aspect 54: An apparatus for wireless communication at a device, the apparatus comprising one or more memories and one or more processors coupled to the one or more memories, the one or more processors configured to cause the device to perform the method of one or more of Aspects 1-13.

Aspect 55: An apparatus for wireless communication, the apparatus comprising at least one means for performing the method of one or more of Aspects 1-13.

Aspect 56: A non-transitory computer-readable medium storing code for wireless communication, the code comprising instructions executable by one or more processors to perform the method of one or more of Aspects 1-13.

Aspect 57: A non-transitory computer-readable medium storing a set of instructions for wireless communication, the set of instructions comprising one or more instructions that, when executed by one or more processors of a device, cause the device to perform the method of one or more of Aspects 1-13.

Aspect 58: A device for wireless communication, the device comprising a processing system that includes one or more processors and one or more memories coupled with the one or more processors, the processing system configured to cause the device to perform the method of one or more of Aspects 1-13.

Aspect 59: An apparatus for wireless communication at a device, the apparatus comprising one or more memories and one or more processors coupled to the one or more memories, the one or more processors individually or collectively configured to cause the device to perform the method of one or more of Aspects 1-13.

Aspect 60: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 14-26.

Aspect 61: An apparatus for wireless communication at a device, the apparatus comprising one or more memories and one or more processors coupled to the one or more memories, the one or more processors configured to cause the device to perform the method of one or more of Aspects 14-26.

Aspect 62: An apparatus for wireless communication, the apparatus comprising at least one means for performing the method of one or more of Aspects 14-26.

Aspect 63: A non-transitory computer-readable medium storing code for wireless communication, the code comprising instructions executable by one or more processors to perform the method of one or more of Aspects 14-26.

Aspect 64: A non-transitory computer-readable medium storing a set of instructions for wireless communication, the set of instructions comprising one or more instructions that, when executed by one or more processors of a device, cause the device to perform the method of one or more of Aspects 14-26.

Aspect 65: A device for wireless communication, the device comprising a processing system that includes one or more processors and one or more memories coupled with the one or more processors, the processing system configured to cause the device to perform the method of one or more of Aspects 14-26.

Aspect 66: An apparatus for wireless communication at a device, the apparatus comprising one or more memories and one or more processors coupled to the one or more memories, the one or more processors individually or collectively configured to cause the device to perform the method of one or more of Aspects 14-26.

Aspect 67: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 27-39.

Aspect 68: An apparatus for wireless communication at a device, the apparatus comprising one or more memories and one or more processors coupled to the one or more memories, the one or more processors configured to cause the device to perform the method of one or more of Aspects 27-39.

Aspect 69: An apparatus for wireless communication, the apparatus comprising at least one means for performing the method of one or more of Aspects 27-39.

Aspect 70: A non-transitory computer-readable medium storing code for wireless communication, the code comprising instructions executable by one or more processors to perform the method of one or more of Aspects 27-39.

Aspect 71: A non-transitory computer-readable medium storing a set of instructions for wireless communication, the set of instructions comprising one or more instructions that, when executed by one or more processors of a device, cause the device to perform the method of one or more of Aspects 27-39.

Aspect 72: A device for wireless communication, the device comprising a processing system that includes one or more processors and one or more memories coupled with the one or more processors, the processing system configured to cause the device to perform the method of one or more of Aspects 27-39.

Aspect 73: An apparatus for wireless communication at a device, the apparatus comprising one or more memories and one or more processors coupled to the one or more memories, the one or more processors individually or collectively configured to cause the device to perform the method of one or more of Aspects 27-39.

Aspect 74: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 40-52.

Aspect 75: An apparatus for wireless communication at a device, the apparatus comprising one or more memories and one or more processors coupled to the one or more memories, the one or more processors configured to cause the device to perform the method of one or more of Aspects 40-52.

Aspect 76: An apparatus for wireless communication, the apparatus comprising at least one means for performing the method of one or more of Aspects 40-52.

Aspect 77: A non-transitory computer-readable medium storing code for wireless communication, the code comprising instructions executable by one or more processors to perform the method of one or more of Aspects 40-52.

Aspect 78: A non-transitory computer-readable medium storing a set of instructions for wireless communication, the set of instructions comprising one or more instructions that, when executed by one or more processors of a device, cause the device to perform the method of one or more of Aspects 40-52.

Aspect 79: A device for wireless communication, the device comprising a processing system that includes one or more processors and one or more memories coupled with the one or more processors, the processing system configured to cause the device to perform the method of one or more of Aspects 40-52.

Aspect 80: An apparatus for wireless communication at a device, the apparatus comprising one or more memories and one or more processors coupled to the one or more memories, the one or more processors individually or collectively configured to cause the device to perform the method of one or more of Aspects 40-52.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a user equipment (UE), comprising:

one or more memories; and one or more processors, the one or more processors, individually or collectively and based at least in part on information stored in the one or more memories, being configured to:

transmit, using a first uplink carrier of a plurality of uplink carriers, on a dedicated uplink slot associated with a second uplink carrier of the plurality of uplink carriers, an enhanced sounding reference signal (eSRS), the eSRS indicating at least one of an uplink carrier quality indication associated with the second uplink carrier or uplink carrier selection information associated with the second uplink carrier, wherein the dedicated uplink slot is included in a plurality of time slots associated with respective uplink carriers of the plurality of uplink carriers; and receive an uplink carrier selection communication indicative of at least one selected uplink carrier of the plurality of uplink carriers.

2. The apparatus of claim 1, wherein the plurality of uplink carriers comprises more than two uplink carriers.

3. The apparatus of claim 1, wherein the uplink carrier selection information indicates at least one recommended uplink carrier of the plurality of uplink carriers.

4. The apparatus of claim 1, wherein the at least one of the uplink carrier quality indication or the uplink carrier selection information comprises a respective uplink carrier quality indication associated with each respective uplink carrier of the plurality of uplink carriers.

5. The apparatus of claim 4, wherein the respective uplink carrier quality indication is based on at least one measurement associated with a respective downlink carrier, of a plurality of downlink carriers, corresponding to the respective uplink carrier of the plurality of uplink carriers.

6. The apparatus of claim 5, wherein the at least one measurement is associated with at least one of a buffer size, a transmission power, a transmission timing, multiple receivers imbalance, a switch between a reception antenna chain and a transmission antenna chain, a path loss, a difference in path loss between a downlink carrier and an associated uplink carrier, a power headroom (PHR), a difference in PHRs between at least two uplink carriers, a UE battery capacity, and/or a traffic quality of service requirement.

7. The apparatus of claim 1, wherein the one or more processors are further configured to transmit UE capability information indicative of a capability for providing the eSRS.

8. The apparatus of claim 1, wherein the at least one of the uplink carrier quality indication or the uplink carrier selection information comprises an eSRS characteristic of the eSRS.

9. The apparatus of claim 8, wherein the eSRS characteristic comprises at least one of an eSRS precoding on an antenna port, transmission timing, an amplitude adjustment on the antenna port, an eSRS sequence on the antenna port, or an eSRS transmission power on the antenna port.

10. The apparatus of claim 1, wherein the one or more processors are further configured to transmit, using the first uplink carrier of the plurality of uplink carriers, a plurality of eSRSs, including the eSRS, on respective time slots of the plurality of time slots.

11. The apparatus of claim 10, wherein the one or more processors are further configured to transmit a radio resource control (RRC) communication that indicates an association between each time slot of the respective time slots and a respective uplink carrier of the plurality of uplink carriers.

12. The apparatus of claim 1, wherein the at least one selected uplink carrier comprises a single selected uplink carrier associated with a two-layer transmission.

13. The apparatus of claim 1, wherein the at least one selected uplink carrier comprises a first selected uplink carrier associated with a first one-layer transmission and a second selected uplink carrier associated with a second one-layer transmission.

14. An apparatus for wireless communication at a network node, comprising:

one or more memories; and one or more processors, the one or more processors, individually or collectively and based at least in part on information stored in the one or more memories, being configured to:

receive, using a first uplink carrier of a plurality of uplink carriers, on a dedicated uplink slot associated with a second uplink carrier of the plurality of uplink carriers, an enhanced sounding reference signal (eSRS), the eSRS indicating at least one of an uplink carrier quality indication associated with the second uplink carrier or uplink carrier selection information associated with the second uplink carrier, wherein the dedicated uplink slot is included in a plurality of time slots associated with respective uplink carriers of the plurality of uplink carriers; and transmit an uplink carrier selection communication indicative of at least one selected uplink carrier of the plurality of uplink carriers.

15. The apparatus of claim 14, wherein the at least one of the uplink carrier quality indication or the uplink carrier selection information comprises an eSRS characteristic of the eSRS.

16. An apparatus for wireless communication at a user equipment (UE), comprising:

one or more memories; and one or more processors, the one or more processors, individually or collectively and based at least in part on information stored in the one or more memories, being configured to:

transmit, using a first uplink carrier of a plurality of uplink carriers, in a first uplink slot associated with a second uplink carrier of the plurality of uplink carriers, uplink channel state information (CSI) indicating at least one of an uplink carrier quality indication associated with the second uplink carrier of the plurality of uplink carriers or uplink carrier selection information associated with the second uplink carrier, wherein the first uplink slot is included in a plurality of time slots associated with respective uplink carriers of the plurality of uplink carriers; and receive an uplink carrier selection communication indicative of at least one selected uplink carrier of the plurality of uplink carriers.

17. The apparatus of claim 16, wherein the plurality of uplink carriers comprises more than two uplink carriers.

18. The apparatus of claim 16, wherein the uplink carrier selection information indicates at least one recommended uplink carrier of the plurality of uplink carriers.

19. The apparatus of claim 16, wherein the at least one of the uplink carrier quality indication or the uplink carrier selection information comprises a respective uplink carrier quality indication associated with each respective uplink carrier of the plurality of uplink carriers.

20. The apparatus of claim 19, wherein the respective uplink carrier quality indication is based on at least one measurement associated with a respective downlink carrier, of a plurality of downlink carriers, corresponding to the respective uplink carrier of the plurality of uplink carriers.

21. The apparatus of claim 20, wherein the at least one measurement is associated with at least one of a buffer size, a transmission power, a transmission timing, multiple receivers imbalance, a switch between a reception antenna chain and a transmission antenna chain, a path loss, a difference in path loss between a downlink carrier and an associated uplink carrier, a power headroom (PHR), a difference in PHRs between at least two uplink carriers, a UE battery capacity, and/or a traffic quality of service requirement.

22. The apparatus of claim 16, wherein the one or more processors are further configured to transmit UE capability information indicative of a capability for providing the uplink CSI.

23. The apparatus of claim 16, wherein the uplink CSI comprises a set of dedicated bits associated with the at least one of the uplink carrier quality indication or the uplink carrier selection information.

24. The apparatus of claim 23, wherein the set of dedicated bits indicates, for each uplink carrier of the plurality of uplink carriers, a respective uplink carrier identifier (ID) and a respective channel quality.

25. The apparatus of claim 16, wherein the uplink CSI indicates:

the uplink carrier quality indication associated with the second uplink carrier, an uplink carrier identifier (ID) associated with the second uplink carrier, an uplink carrier quality indication associated with the first uplink carrier, and an uplink carrier ID associated with the first uplink carrier.

26. The apparatus of claim 16, wherein the uplink CSI indicates the uplink carrier quality indication associated with the second uplink carrier and an uplink carrier identifier (ID) associated with the second uplink carrier, and wherein the one or more processors are further configured to transmit, using the first uplink carrier, additional uplink CSI in a second uplink slot of the plurality of time slots, wherein the additional CSI comprises an uplink carrier quality indication associated with the first uplink carrier and an uplink carrier ID associated with the first uplink carrier.

27. The apparatus of claim 16, wherein the at least one selected uplink carrier comprises a single selected uplink carrier associated with a two-layer transmission.

28. The apparatus of claim 16, wherein the at least one selected uplink carrier comprises a first selected uplink carrier associated with a first one-layer transmission and a second selected uplink carrier associated with a second one-layer transmission.

29. An apparatus for wireless communication at a network node, comprising:

one or more memories; and one or more processors, the one or more processors, individually or collectively and based at least in part on information stored in the one or more memories, being configured to:

receive, using a first uplink carrier of a plurality of uplink carriers, in a first uplink slot associated with a second uplink carrier of the plurality of uplink carriers, uplink channel state information (CSI) indicating at least one of an uplink carrier quality indication associated with the second uplink carrier of the plurality of uplink carriers or uplink carrier selection information associated with the second uplink carrier, wherein the first uplink slot is included in a plurality of time slots associated with respective uplink carriers of the plurality of uplink carriers; and transmit an uplink carrier selection communication indicative of at least one selected uplink carrier of the plurality of uplink carriers.

30. The apparatus of claim 29, wherein the uplink CSI indicates:

the uplink carrier quality indication associated with the second uplink carrier, an uplink carrier identifier (ID) associated with the second uplink carrier, an uplink carrier quality indication associated with the first uplink carrier, and an uplink carrier ID associated with the first uplink carrier.

* * * * *